(12) United States Patent
Thomas et al.

(10) Patent No.: US 10,407,787 B2
(45) Date of Patent: Sep. 10, 2019

(54) METHOD AND APPARATUS FOR SEPARATION OF ALUMINUM FROM ALUMINUM-CONTAINING SOURCE MATERIALS

(71) Applicant: TAT-TECH, INC, La Junta, CO (US)

(72) Inventors: Jose Thomas, Rancho Cucamonga, CA (US); David Max Dutton, La Junta, CO (US); Joseph Wayne Tatman, La Junta, CO (US)

(73) Assignee: Himonic LLC, Rancho Cucamonga, CA (US)

(*) Notice: Subject to any disclaimer, the term of this patent is extended or adjusted under 35 U.S.C. 154(b) by 935 days.

(21) Appl. No.: 14/828,611

(22) Filed: Aug. 18, 2015

(65) Prior Publication Data
US 2016/0002799 A1    Jan. 7, 2016

Related U.S. Application Data

(63) Continuation-in-part of application No. 14/496,894, filed on Sep. 25, 2014, now abandoned.
(Continued)

(51) Int. Cl.
*B07B 15/00* (2006.01)
*C25C 5/02* (2006.01)
(Continued)

(52) U.S. Cl.
CPC ............ *C25C 5/02* (2013.01); *C22B 21/0069* (2013.01); *C25C 7/02* (2013.01); *B22F 2999/00* (2013.01); *Y02P 10/212* (2015.11)

(58) Field of Classification Search
CPC ..... C25C 5/02; C25C 7/02; C25C 5/00; B22F 9/20; B22F 9/14; B22F 2999/00;
(Continued)

(56) References Cited

U.S. PATENT DOCUMENTS

| 3,766,045 A | * | 10/1973 | Itakura | ................ C02F 1/46109 204/270 |
| 7,393,438 B2 | * | 7/2008 | Marsden | ................... C25C 5/02 204/267 |

(Continued)

FOREIGN PATENT DOCUMENTS

| CN | 105132698 A | 12/2015 |
| JP | H0412015 A | 1/1992 |

OTHER PUBLICATIONS

International Search Report and Written Opinion dated Dec. 9, 2016 for International Patent Application No. PCT/IB2016/055164.

*Primary Examiner* — Walter D. Griffin
*Assistant Examiner* — Cameron J Allen
(74) *Attorney, Agent, or Firm* — Schiff Hardin LLP

(57) ABSTRACT

Method and apparatus thereof to separate aluminum from aluminum-containing source material, such as fly ash, includes preparing a slurry of the source material and water in an agitation tank and adding a leaching reactant to the slurry in an amount dependent on the amount of aluminum in the source material. After agitation, transferring the mixture to a settling pond. After settling, transferring the liquid as a pregnant solution to an electric cell. Treating the pregnant solution in the electric cell by applying an electrical current that is periodically reversed as the pregnant solution passes between at least two metal plates in the electric cell. Collecting the treated solution in a cone bottom tank and separating aluminum particles from the treated solution using a filter press. Drying the particulate aluminum and pressing the aluminum into solid shapes.

7 Claims, 14 Drawing Sheets

Related U.S. Application Data

(60) Provisional application No. 61/882,481, filed on Sep. 25, 2013, provisional application No. 61/892,491, filed on Oct. 18, 2013, provisional application No. 61/882,514, filed on Sep. 25, 2013.

(51) Int. Cl.
*C25C 7/02* (2006.01)
*C22B 21/00* (2006.01)

(58) Field of Classification Search
CPC ....... B22F 9/24; B01D 25/12; C22B 21/0069; Y02P 10/21; B07B 15/00
See application file for complete search history.

(56) References Cited

U.S. PATENT DOCUMENTS

| | | | |
|---|---|---|---|
| 8,458,952 B1* | 6/2013 | Davies | C12N 1/12 47/1.4 |
| 9,139,445 B2 | 9/2015 | Sun et al. | |
| 2011/0196188 A1 | 8/2011 | Giertz | |
| 2014/0230604 A1* | 8/2014 | Pavlovich | C22B 3/10 75/300 |
| 2015/0027902 A1 | 1/2015 | Gharda | |
| 2016/0002799 A1 | 1/2016 | Thomas et al. | |

\* cited by examiner

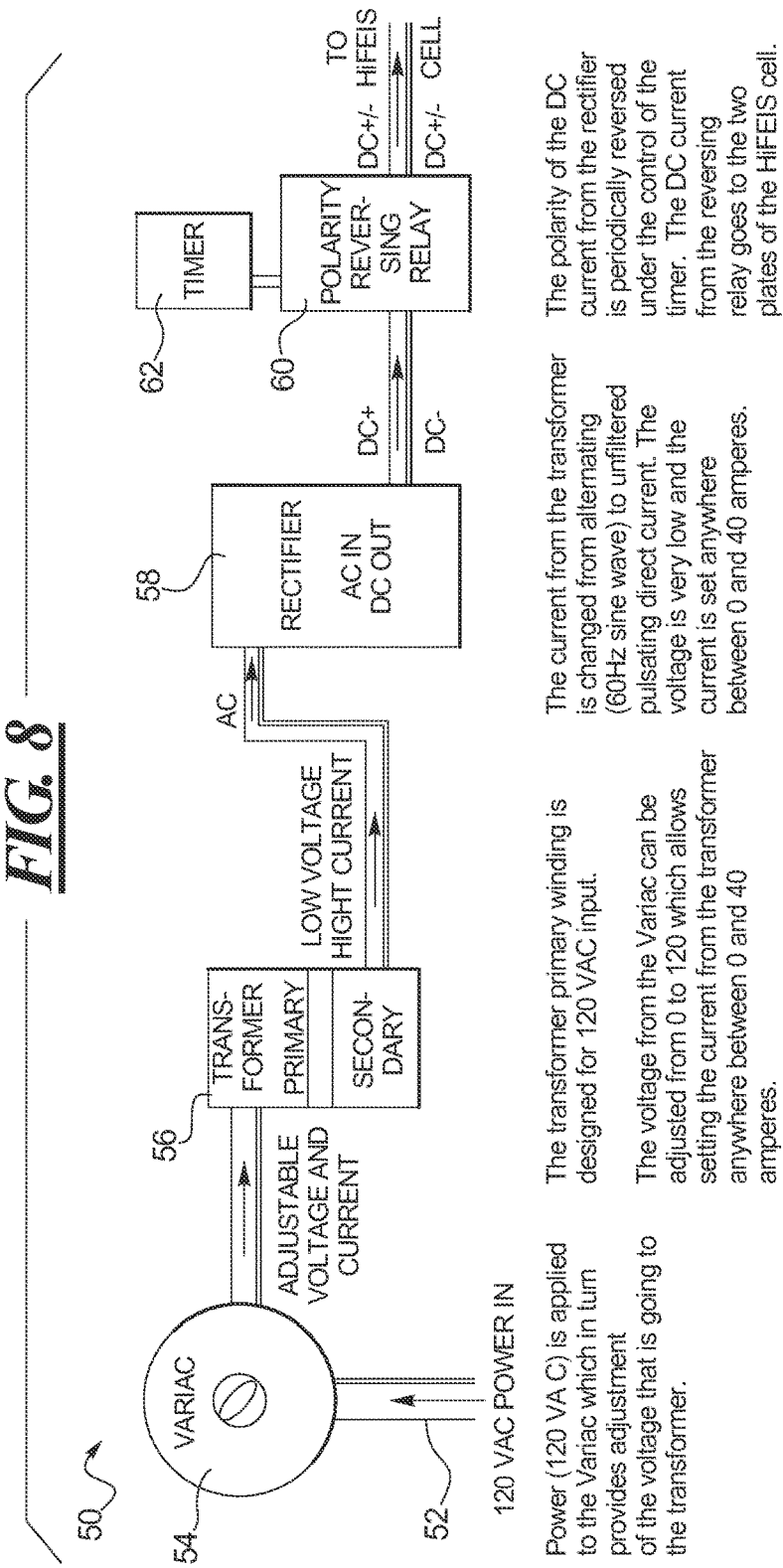

METHOD AND APPARATUS FOR SEPARATION OF ALUMINUM FROM ALUMINUM-CONTAINING SOURCE MATERIALS

CROSS-REFERENCE TO RELATED APPLICATIONS

This application is a continuation-in-part patent application of U.S. Ser. No. 14/496,894, filed Sep. 25, 2014, the entirety of which is incorporated herein by reference.

This application claims the benefit of U.S. Ser. No. 61/882,481, filed Sep. 25, 2013; U.S. Ser. No. 61/882,491, filed Sep. 25, 2013; and U.S. Ser. No. 61/882,514, filed Sep. 25, 2013, each of which is incorporated herein by reference.

BACKGROUND OF THE INVENTION

Field of the Invention

The present invention relates generally to method and apparatus for separating aluminum from aluminum containing source materials, such as fly ash, and more particularly to a method and apparatus for separating aluminum from a solution using an electric current, as well as to a method and apparatus for separating and collecting hydrogen gas.

Description of Related Art

Aluminum is a commercially important metal and is naturally found in the form of bauxite, an ore containing aluminum oxide or alumina. Traditionally, aluminum is recovered via surface mining of bauxite, which is then refined (e.g., using the Bayer refining process) into aluminum oxide. From there, smelting processes (e.g., electrolytic reduction) are used to extract aluminum metal from aluminum oxide. These traditional processes are time- and energy-consuming.

With the continued and growing need for aluminum, there is an interest in finding alternative, more efficient, and cheaper ways to extract, isolate, or recover aluminum to address such need.

Aluminum is present in various materials, including fly ash. Fly ash is a residue or by-product of coal combustion such as from burning of ground or powdered coal in coal-fired power plants. Fly ash is captured by pollution control equipment before the flue gasses reach the chimney of the power plant, and is typically discarded as a waste. However, fly ash contains substantial amounts of aluminum oxide, depending on the mineral compounds present in the coal-bearing rock strata from which the coal is mined, and thus can be used as a source material for aluminum.

Other substances, such as bauxite, alumina, or aluminum hydroxide, can also contain aluminum, and can act as source materials for aluminum.

Thus, it would be advantageous to develop economical, energy-efficient ways to extract, isolate, or recover aluminum from substances containing aluminum. It also would be advantageous to use waste materials, such as fly ash, as source materials to extract, isolate, or recover aluminum.

Hydrogen gas is a commercially valuable product. It would be advantageous to generate and collect hydrogen gas during treatment of source materials and/or during desalination of sea water.

BRIEF SUMMARY OF THE INVENTION

A method and apparatus are provided for separating aluminum from an aluminum-containing source material and a method and apparatus for separating and collecting hydrogen gas.

In accordance with an aspect of the present invention, the aluminum-containing source material can be fly ash or other material such as bauxite, alumina, aluminum hydroxide, or the like. The aluminum-containing source material can be mixed with water to form a slurry. A leaching agent, such as sodium hydroxide or the like, can be added to the slurry and the mixture can be agitated for a period of time. The agitated mixture can then be moved to a settling container. After settling for a period of time, a solution containing aluminum can be drawn off from the settling container. The solution can then be passed between at least two plates of an electric cell. A current of periodically reversing polarity can be applied to the at least two plates of the electric cell, which causes particles of aluminum to form in the solution. After passing the solution through the electric cell, the solution can be moved to a tank. The solution can be drained from the tank and filtered to remove the aluminum particles from the solution. The aluminum particles can then be collected and dried, and ultimately compressed to form briquettes or other solid shapes. Usable, salable aluminum can thus be obtained from the aluminum-containing source material, such as fly ash.

The method and apparatus described herein provide a factory or processing plant for recovery of the aluminum on a production scale. Re-use of the materials used in the process described herein, as well as recovery of other materials from the aluminum-containing source material are achievable.

In accordance with another aspect of the present invention, a method to separate aluminum-containing compounds from a solution, comprising:
 a. preparing a slurry comprising fly ash;
 b. passing the slurry into an agitation tank;
 c. preparing a pregnant solution by mixing the slurry in the agitation tank with water and sodium hydroxide;
 d. agitating the pregnant solution in the agitation tank;
 e. transferring the pregnant solution to a pond;
 f. transferring the pregnant solution from the pond to an electric cell;
 g. treating the pregnant solution in the electric cell to form particulate aluminum in the treated pregnant solution;
 h. passing the treated pregnant solution to a tank;
 i. separating a barren solution from the particulate aluminum and collecting the barren solution;
 j. collecting elemental aluminum from the tank and into a filter press;
 k. pressing the elemental aluminum to eliminate moisture and to concentrate the elemental aluminum into a wet aluminum powder;
 l. drying the wet aluminum powder by a drier system to create dried aluminum powder; and
 m. pressing the dried aluminum powder into briquettes by a pressing system.

In a further aspect of the present invention, wherein preparing a pregnant solution by mixing the slurry in the agitation tank in a ratio of approximately 1 part fly ash to approximately 4 parts water and by adding approximately 2 fluid ounces of sodium hydroxide to approximately 1 pound of potential elemental aluminum yield, wherein the potential elemental aluminum yield is calculated as a percentage of aluminum in the fly ash.

In a further aspect of the present invention, wherein the step of treating the pregnant solution in the electric cell comprises the steps of:
  a. introducing a controlled electrical current, which is periodically reversed,
  b. passing the pregnant solution between two metal plates; and
  c. collecting the treated pregnant solution in a cone bottom tank.

In a further aspect of the present invention, further comprising collecting unburned carbon from the slurry by a column flotation cell system before passing the slurry into the agitation tank.

In a further aspect of the present invention, further comprising removing iron from the slurry by a magnetic iron separator system before passing the slurry into the agitation tank.

In another aspect of the present invention, a method to separate aluminum from aluminum-containing source materials, comprising:
  a. preparing a slurry comprising fly ash;
  b. passing the slurry into an agitation tank;
  c. preparing a pregnant solution by mixing the slurry in the agitation tank with water and sodium hydroxide;
  d. agitating the pregnant solution in the agitation tank;
  e. transferring the pregnant solution to a pond;
  f. transferring the pregnant solution from the pond to an electric cell;
  g. treating the pregnant solution in the electric cell by introducing a controlled electrical current, which is periodically reversed, and passing the pregnant solution between at least two metal plates in the electric cell;
  h. passing the treated pregnant solution to a tank;
  i. separating a barren solution from particulate aluminum in the treated pregnant solution and transferring the separated barren solution to a pond;
  j. collecting the particulate aluminum from the tank and into a filter press;
  k. pressing the particulate aluminum to eliminate moisture and to concentrate the particulate aluminum into a wet aluminum powder;
  l. drying the wet aluminum powder by a drier system to create dried aluminum powder; and
  m. pressing the dried aluminum powder into briquettes by a pressing system.

In a further aspect of the present invention, wherein preparing the pregnant solution by mixing the slurry in the agitation tank in a ratio of approximately 1 part fly ash to approximately 4 parts water and by adding approximately 2 fluid ounces of sodium hydroxide to approximately 1 pound of potential elemental aluminum yield, wherein the potential elemental aluminum yield is calculated as a percentage of aluminum in the fly ash.

In a further aspect of the present invention, further comprising: collecting unburned carbon from the slurry by a column flotation cell system before passing the slurry into the agitation tank.

In a further aspect of the present invention, further comprising: removing iron from the slurry by a magnetic iron separator system before passing the slurry into the agitation tank.

In another aspect of the present invention, a method of separating aluminum from a source material, comprising:
  mixing the source material and water and sodium hydroxide to form a slurry; agitating the slurry for a first period of time;
  settling the slurry for a second period of time to obtain a pregnant solution;
  passing the pregnant solution between plates of an electric cell while passing an electrical signal through the plates to form aluminum particulate in the solution; and
  separating the aluminum particulate from the liquid.

In a further aspect of the present invention, wherein the electrical signal is a direct current that is reversed in polarity at a predetermined frequency.

In another aspect of the present invention, an apparatus for separating aluminum from a source material, comprising:
  an agitating tank that is operable to agitate a slurry comprising the source material, water, and a leaching reactant;
  a holding containment that is connected to receive the agitated slurry from the agitating tank to separate a pregnant solution from settled solids;
  a pump to transfer the pregnant solution from the holding containment;
  an electric cell including at least two parallel conductive plates spaced apart by a distance to form a treatment space to receive the pregnant solution;
  a power supply connected to the at least two parallel conductive plates and operable to apply an electrical signal to the at least two parallel conductive plates to form a treated solution comprising aluminum particulate; and
  a separator connected to receive the treated solution and operable to separate the aluminum particulate from the treated solution.

In a further aspect of the present invention, wherein the separator includes a cone bottom tank and a filter press.

In a further aspect of the present invention, wherein the electric cell includes the at least two parallel conductive plates having an inlet for the pregnant solution at a lower position and an outlet for the treated solution at an upper position, and a gas outlet above the outlet for the treated solution.

In a further aspect of the present invention, wherein the at least two parallel conductive plates are of magnesium alloy, stainless steel, carbon, carbon-based material, or a combination thereof.

In a further aspect of the present invention, wherein the agitating tank includes a plurality of agitating tanks connected to receive the slurry; wherein the holding containment includes a plurality of ponds connected to receive the agitated slurry; and further comprising:
  a containment for barren solution separated from the aluminum particulate.

BRIEF DESCRIPTION OF THE DRAWINGS

The figures are for illustration purposes only and are not necessarily drawn to scale. The invention itself, however, can best be understood by reference to the detailed description which follows when taken in conjunction with the accompanying drawings in which:

FIG. 8 is a functional block diagram showing the use of electrical power in accordance with the aspect of the present invention.

DETAILED DESCRIPTION OF THE INVENTION

Figure 11:
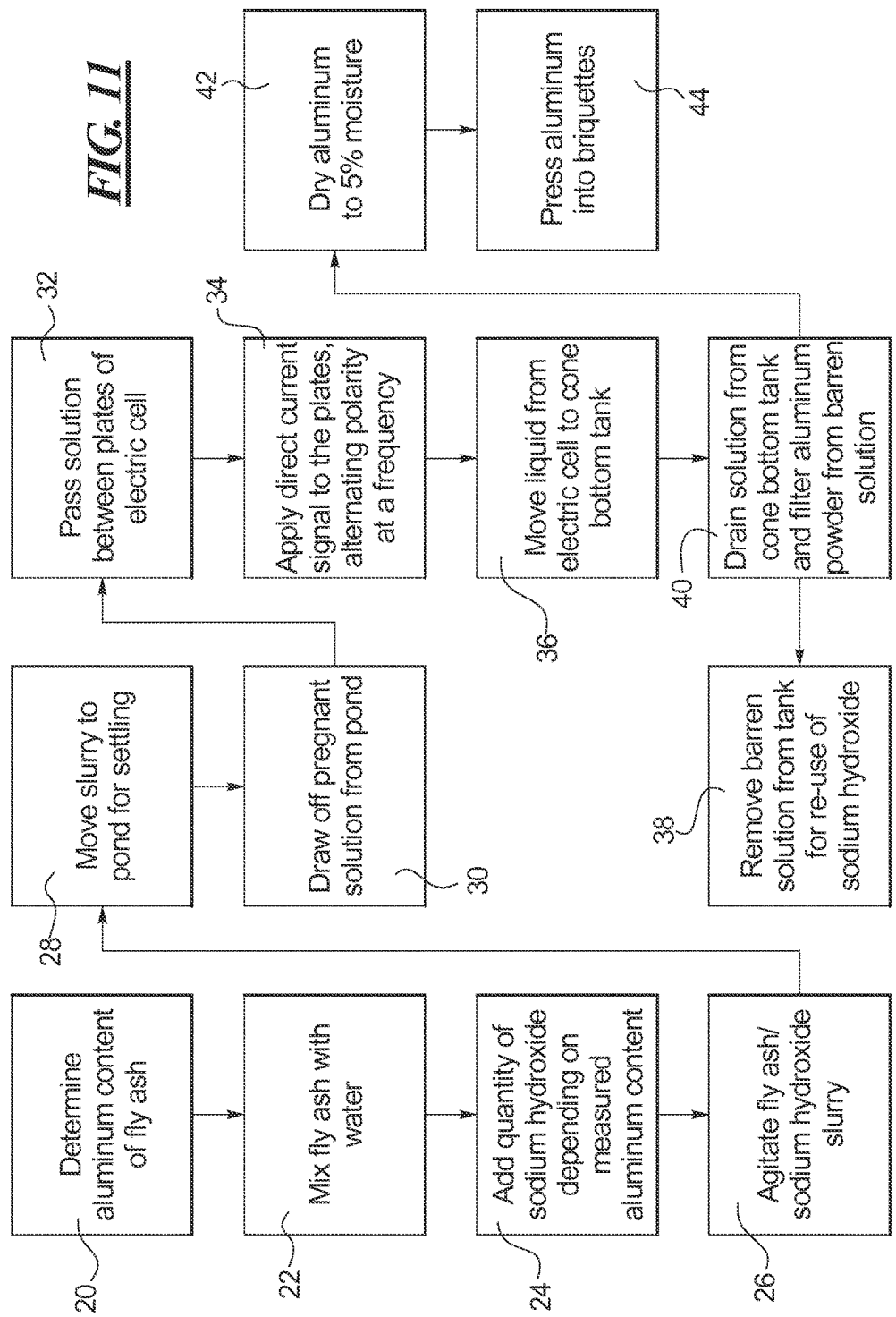
FIG. 11 is a flow chart showing an exemplary aspect of the present invention.

A methods and apparatus are disclosed herein that provide remediation of waste and other source materials and/or desalination of sea water. The method and apparatus results in the separation and collection of one or more end products, several of which are described herein. Of the products that may be collected, the collection of two such products—aluminum and hydrogen gas—are described in further detail in this specification, Collection of Aluminum As shown in FIG. 11, and as an example, fly ash is provided as a source material from which recovery of aluminum is desired. In step 20, the aluminum content of the fly ash is determined. For example, one or more samples of the fly ash can be sent to a lab for analysis for elemental content to obtain an indication of the quantity of aluminum in the samples. The lab can also check for silica, iron, and other materials. The aluminum recovery facility can have a lab for testing the samples in-house.

In step 22, the fly ash is mixed with water. The fly ash or other source material can be dry, damp, or wet at the start of the process. The fly ash can be mixed with the water in an agitation tank, or can be mixed with the water prior to transfer to the agitation tank. The fly ash can be transferred to a storage container, such as a storage pit as a water-based slurry prior to transfer to the agitation tank.

In one example, the fly ash is mixed with water in a ratio of approximately 1:4. The ratio of ash to water should be at least 1:4 to provide a low viscosity for transfer without diluting the leaching agent. A higher amount of water can be provided but less water means that less of the leaching agent is used.

A similar process or the same process is followed for bauxite as a source material. For alumina or aluminum hydroxide as a source material, the process can be similar or can vary from the process for fly ash.

In step 24, a quantity of a leaching agent is added to the fly ash and water mixture. The leaching agent of one example is sodium hydroxide (NaOH), also referred to as lye or caustic soda. The quantity of sodium hydroxide of a certain example is approximately two fluid ounces of liquid sodium hydroxide to approximately each pound of aluminum in the fly ash, as determined by the testing of step 20. The quantity of sodium hydroxide can vary depending on the pH and/or temperature of the fly ash and water mixture. The higher the pH of the makeup solution (fly ash and water mixture), the less sodium hydroxide is needed to reach a desired pH for leaching. More sodium hydroxide can be required for an ash and water mixture that has a lower pH. The quantity of leaching agent can also be different if the leach desired has a lower pH.

Different leaching agents can be used depending on characteristics of the fly ash or other source material. For example, fly ash or other source material can be tested to determine the initial pH of the material or the pH of the material at a stage in the process, and whether an alkaline leaching agent and/or acid leaching agent should be used to obtain a desired pH of the solution. The source material characteristics can vary from treatment site to treatment site, or within a treatment site, resulting in the use of different leaching agents for one or more source materials. Examples of leaching agents include, but not limited to, citric acid, acetic acid, hydrochloric acid, sulfuric acid, phosphoric acid, sodium hydroxide, and the like. Organic acids, which include, but not limited to, citric acid and acetic acid are preferred. Phosphoric acid can be effective in a pH range of 4.85 to 5.35. Other presently known leaching agents can also be used in connection with the present invention.

In certain examples, an optimum pH range for the water/ash/leaching agent mixture is 10 to 12. The pH range of 10 to 12 can be used as a good starting point for testing of a source material. A pH range of 10.65 to 11.85 can be effective, for example, when using an alkaline leaching agent. Other ranges, whether in the acidic or basic pH ranges, are possible depending on the source material and/or depending on the target solution. An acceptable pH value is determined by testing the target solution to be processed.

When an acid is used as the leaching agent, a general target pH range may be a pH of 4 to 6, for example, as a good starting point for testing of a source material. A pH range of 4.85 to 5.35 can be used as an effective pH range for some source materials using acidic leaching agents. For example, phosphoric acid, citric acid, acetic acid, hydrochloric acid and sulfuric acid can be used as acid leaching agents. Organic acids (citric and acetic acids) can be preferred even though phosphoric acid was found to be effective with pH ranging from 4-6, or more specifically at pH 4.85-5.35.

Leaching reactants or compounds can vary to obtain the desired effect on the target solution. This can be determined by testing because target solutions can vary from site to site. Sodium hydroxide (NaOH) has been found to be effective for our tested samples of fly ash, other materials can provide differences in efficiency, cost effectiveness, and yield. The properties of the target solution (the source material and water mixture), results in variations in the type, quantity and effectiveness of the leaching agent for a particular source material.

The leaching agent can be provided in different concentrations and different forms. The leaching agent is available in liquid form (as sodium hydroxide), in powder form (as caustic soda or soda ash) or in flake form (as lye). They all have the same chemical composition but concentrations can vary. The higher the concentration of leaching agent used, the less volume needed. Solid leaching agents are mixed with water which results in a lower fly ash to water ratio.

Step 26 is agitating the fly ash and leaching agent mixture. The duration of the agitation phase will vary on the feed stock/target solution. Testing is necessary for each site and individual feed stocks (source material). The duration of agitation has an effect on aluminum recovery. In certain examples, four hours is a minimum agitation time with certain source material. Multiple agitation tanks can be provided for increased production. During the agitation step, the aluminum is dissolved into solution as a result of the leaching which occurs during the agitation.

The agitating step 26 of certain embodiments is performed in an agitation tank. The sodium hydroxide is added while the ash and water mixture is in the agitation tank, according to certain embodiments.

In step 28, the agitated mixture or slurry is moved to a settling container, such as a settling pond or other containment. The mixture is allowed to settle in the pond for a duration that is at least four hours in certain embodiments. The duration of the settling step can vary from four to eight hours, as a compromise between sufficient time to settle the mixture and obtaining a greater production rate. Multiple settling containers or ponds can be provided to increase productivity.

After completion of the settling step, the solution is to be removed from the settling containment or pond, as shown in step 30. The solution that is drawn off from the settling pond is referred to as a pregnant solution. The draw off or transfer of the pregnant solution should be done without disturbing the settled material in the bottom of the settling pond for better efficiency. If some of the settled precipitate does get transferred along with the pregnant solution, there will be minimal effect on the purity of the finished recovered aluminum. Any impurities will be purged from the recovered aluminum during the smelting process.

In step 32, the solution that was drawn off of the settling pond is passed between plates of an electric cell. After the suspended precipitates have settled from the liquid, leaving aluminum in solution in the liquid, the liquid can be referred to as a pregnant solution. In certain embodiments, the pregnant solution is kept constantly moving through the electric cell. The movement of the pregnant solution can be by gravity or by the actions of a pump. The flow rate of the solution through the electric cell can vary and can be determined by testing of the pregnant solution.

In step 34, an electrical signal is applied to the plates of the electric cell as the liquid is passed through the cell. The application of the electrical signal to the pregnant solution results in the aluminum in the solution being converted to a particulate form. The electric cells can have two or more plates, and can be of any size and/or shape. The size of the electric cell can be changed depending on the flow rate desired and the production goals using the present invention. The electric cell can be of a closed construction or an open construction.

In certain embodiments, the particles of aluminum are approximately 4-8 microns in size. In certain embodiments, the electric signal is a direct current (DC) signal that is applied with alternating polarity at a predetermined frequency. In certain embodiments, the frequency range of the electric signal is in a range of 42,000-42,800 kHz (kilo Hertz) carried on a sustained 10 VAC (Volts Alternating Current). Although this frequency range and voltage has been effective, the frequency and voltage can vary from site to site and different feed stock (source material). Testing should be performed to determine the electric signal for a given source material and apparatus.

The voltage applied to the electric cell can vary depending on the conductivity of the target solution and the cell material. Testing has been conducted using a range between 4-32 ADC (Amps Direct Current) and 3-30 VDC (Volts Direct Current). Testing can be performed for selecting an electrical signal to be used for processing of different source material.

The waveform of the electric signal applied to the electric cell for the frequency signal is a sine wave in certain embodiments. The waveform for the current is a square wave in certain embodiments. Other wave forms for both the frequency signal and current can be effective.

The electric cell can result in gasses being produced during the processing. The gasses can be vented from the electric cell. In certain embodiments, an exhaust system is used to vent gases produced during processing.

The flow rate through the cell can vary with the size, number and surface area of the cell plates. To optimize production, a faster flow rate is better. Three controlling factors can effect optimal production:
1. Electrical power introduced to the cells;
2. Distance between the plates of the cell; and
3. Flow rate of the liquid through the cells.

One of the variables is the conductivity of the liquid, because this will affect the amount of current introduced to the cell and the optimal flow rate. These are all variables that can be changed following testing for each different source material, even from the same site, as factors can vary from day to day depending on what type of coal is used by the power plant, either from different sources or different geological layers. Constant monitoring of output percentages is important.

Factors that are considered in determining current strength and frequency of the electrical signal include conductivity of the solution as a main trait of interest. Testing is performed to determine what current strength to use. Another variable is the properties of the makeup water being used, i.e., how many grains of hardness does the water contain. The higher the hardness the more conductive the solution will be. To determine optimal parameters, testing is performed.

The electric cell includes plates of material to which the electrical signal is applied. Magnesium alloy plates can be used for alkaline solutions and not for acidic solutions. Certain stainless steel plates, such as 317L alloy steel, can be used for either alkaline or acidic solutions although they are not as conductive as magnesium alloy. Aluminum and copper plates, while very conductive, can deteriorate rapidly with this process. In certain embodiments, the plates should be highly conductive, non-degradable and inexpensive. Plates of magnesium alloy and 317L stainless steel are not as reactive with the solution. Plate materials that are high on the Galvanic Scale, such as gold, silver and platinum, are optimal but are too expensive for practical use. An alternative embodiment includes plates formed of carbon, a carbon-based material, or a combination thereof.

The electric cell need not be of any particular dimensions. However, electric sells of sizes as small as nine inches by two inches have been used to electric cells of size thirty-two inches by nine inches. Electric cells of size four feet by three feet have also been used for production levels. The size of the cell used is not as important as the surface area of the cells exposed to the solution. A parameter that can be controlled is the distance between the plates in the cells.

A single electric cell can be provided or multiple cells can be provided. Depending upon the desired production rate, the size and number of electric cells can vary. Since metal plates, generally, are available in three feet by eight feet stock size, it would be prudent to build the electric cells of this size. A calculation of flow rate through each cell and a determination of the cell size and the production goals of the facility will determine by multiplication how many cells will be needed to process a given quantity of material. In an example as illustrated hereinafter, the facility should be able to process approximately 450 tons of fly ash in a 24 hour period.

In step 36, the liquid that has passed through the electric cell is transferred to a settling tank. The settling tank of certain embodiments is a cone-bottom tank. The particulate aluminum begins to settle to the bottom of the settling tank. In step 38, the barren solution from which the particulate aluminum has been removed is transferred for recovery of the sodium hydroxide or for re-use of the water and sodium hydroxide mix. The barren solution can be removed from the top of the settling tank. In step 40, the particulate aluminum is removed from the cone bottom tank, such as from the bottom of the cone bottom tank.

In certain embodiments, the liquid is transferred to the cone bottom tank but it not held for a settling time in tank. The solution and aluminum particle mixture is transferred into the cone bottom tank and is immediately pumped from the cone bottom tank into a filter press where the elemental aluminum is captured and the barren solution drained from the aluminum. The barren solution is collected in a trough under the filter press as the elemental aluminum is captured in the filter press. The barren solution is then transferred to a holding tank or pond where it is stored and eventually pumped back into the agitation tank and used as makeup water. Since the pH of the barren solution is already near optimal for leaching, re-use of the water and sodium hydroxide mixture will decrease the volume of leaching agent used in processing of subsequent batches.

In certain embodiments, the barren solution and elemental aluminum are pumped from the bottom of the cone shaped tank via a high pressure pump and fed into the filter press where the barren solution escapes into a trough and the elemental aluminum is captured in the filter membrane. In certain embodiments, some of the barren solution is removed and recovered from the top of the tank and some is removed and recovered in the filtering of the aluminum particles. In other embodiments, the barren solution is removed only from the top of the tank or only when filtering the aluminum particles from the solution. When the membrane of the filter press is saturated with elemental aluminum, the press is released and the aluminum removed.

A valve can be provided at the outlet of the cone bottom tank to permit the process to be halted.

In step 42, the aluminum is dried. In certain embodiments, the drying-step reduces the moisture content of the aluminum to approximately 5%. A conveyor gas or electric drier can be used to dry the elemental aluminum powder. The 5% moisture level has been selected because the aluminum powder must have some moisture content before it can be compressed into briquettes. This assures that the briquette is cohesive. Since a liquid cannot be compressed, the process should not exceed safe pressure levels in the briquetter. In certain embodiments, the small size of the aluminum particles can permit the moisture content to be less than 1%.

In step 44, the aluminum is compressed into briquettes. The force required to form the briquettes can depend on the particle size. Heat is not applied in the briquette forming step of certain embodiments. The resulting briquettes of aluminum can be feed into a furnace or molten pool and are less prone to oxidation. The aluminum powder can vaporize when fed to a furnace if not formed into a solid body.

Returning to step 38, the barren solution contains approximately 20-25% of the initial amount of sodium hydroxide that was added in the leaching/agitation process and has a higher pH than water, which is ideal for repurposing as makeup water in the agitation tanks. In certain embodiments, the sodium hydroxide is not recovered from the barren solution. The entire barren solution containing the unused sodium hydroxide is stored in a pond and used for makeup water.

Additional features of the method can provide carbon and iron recovery before agitation. Two of the three techniques being considered for carbon recovery are off-the-shelf technologies and the third is skimming the carbon from the top of the agitation tanks. Iron recovery is also an off-the-shelf technology.

The waste and overflow really contain nothing that didn't come out of the fly ash initially, so it can be returned to the fly ash pit or a holding/settling pond. Most or all of the residual elements left after processing have other uses and can be processed by other methods.

Certain aspects of the present invention will now be described in further detail. The method to separate aluminum from aluminum-containing materials performs the separation in solution. The method includes the steps of preparing a slurry containing the source material; passing the slurry into an agitation tank; and preparing a pregnant solution by mixing the slurry in the agitation tank. The slurry in the agitation tank is prepared in one example by combining a ratio of 1 part fly ash to 4 parts water and adding 2 ounces of sodium hydroxide for each 1 pound (16 ounces) of potential elemental aluminum yield from the source material. The potential elemental aluminum yield is calculated as a percentage of the aluminum in the fly ash as determined by testing of the source material. The slurry is agitated in the agitation tank to obtain a pregnant solution. The method continues by transferring the pregnant solution to a pond or containment for settling. After settling, the pregnant solution is transferred from the pond to a HiFEIS electric Cell where the pregnant solution is treated in the HiFEIS Cell. In certain embodiments, the treated solution is passed via gravity feed to a cone bottom tank. In some embodiments, the method provides for pumping a barren solution from a top of the cone bottom tank and diverting the barren solution to a pond. The method continues by collecting elemental aluminum from a bottom of the cone bottom tank and transferring the aluminum into a filter press; where pressing of the elemental aluminum is performed to eliminate much of the liquid and obtain a damp powder of elemental aluminum. The method continues by drying the aluminum powder by means of a drier system to create dried or nearly dried aluminum powder. The dried aluminum powder is pressed to form briquettes.

Examples of the method of the present invention further comprises treating the pregnant solution in the HiFEIS electric Cell by applying a controlled electrical current, which is periodically reversed, to metal plates of the electric cell, and passing the pregnant solution between two of the metal plates while the current is being applied. The resulting treated liquid is collected and provided to a cone bottom tank.

In particular developments, the present method relates to a method to separate elemental aluminum from a slurried solution (for example, a solution of water with bauxite, fly ash, alumina, or aluminum hydroxide), by passing the solution between two metal plates that are subjected to a controlled electrical current that is periodically reversed. The variable controlling factors to achieve the desired result are: plate material, plate size, distance between the plates, make up and viscosity or specific gravity of the solution, resident time of solution between the plates, amount of current subjected to the plates and the frequency and longevity of the current reversal to the plates.

The following glossary sets forth terminology used to in the present application to describe embodiments of the present method and apparatus, as set forth herein.

"HiFEIS" is an acronym derived from High Frequency Electro Induction System, which refers to an electric cell of certain embodiments of the present invention.

"HiFEIS Cell" comprises, in the case of aluminum extraction, two or more plates, mounted parallel to one another or in any other configuration, having the opposing walls spaced apart by a distance of from about 3/16 inch to about 1/4 inch, which plates are constructed preferably of magnesium alloy or stainless steel, and between which plates a pregnant target solution is passed while being exposed to a reversing treating direct current that is applied to the plates. A size and a shape of a HiFEIS Cell can vary depending on treatment goals of a target solution. The treating direct current also can vary depending on the target solution to be treated. Testing of the effects of different direct current levels, frequency and duration of polarity reversals, plate spacing, and cell structure can be performed to determine an effective current level and reversing characteristic for treating a particular target solution by a particular electric cell. The treating direct current needed to treat the target solution is determined by testing.

"HiFEIS Power Source" comprises an alternating power source that can be adjusted to vary its output.

"HiFEIS Controller" controls the input of direct current power to the HiFEIS Cell and alternates the current shift back and forth, through the target solution, from plate surface to plate surface. The HiFEIS Controller also can contain a timer control to adjust a frequency and longevity of current shift changes as desired.

"Agitation Tanks" of certain embodiments are tanks that include devices to agitate a liquid contained in the tanks, such as a target solution. The agitation tanks provide agitation of the liquid in the tank for leaching the aluminum from the target compound. The agitation tanks can vary in size depending on a project. In certain examples, the agitation tanks are approximately 50 feet diameter by approximately 10 feet deep.

"Leaching reagents" can vary. In certain examples of the method, sodium hydroxide is used as a leaching reagent in a proportion of 2 fluid ounces of sodium hydroxide to 1 pound or 16 ounces of potential elemental aluminum yield as established by prior testing of the source material.

"Ponds" are holding ponds, tanks or other holding structures or containments that are used for storage of make-up water and solutions or for recycling of used solutions.

"Slurry" is a mixture of a target compound or source material with water to make up a solution that can be treated with a leaching agent to form a pregnant solution which solution can be processed through a HiFEIS Cell.

"Pregnant Solution" is a solution that carries a target element, in the method of the present invention, aluminum, to be processed through the HiFEIS Cell.

"AC" means alternating current.

"DC" means direct current.

As shown in FIG. 8, a power supply 50 includes a proprietary HiFEIS Power Source and HiFEIS Controller to generate power to the electric cell. The power supply 50 includes a 120 volt AC input 52, such as line power, that is adjustable by a variac 54, the output of which is provided to a primary winding of a transformer 56 to provide an adjustable input to the transformer 56. The transformer 56 has a secondary winding from which a high current, low voltage AC signal is available. The transformer 56 provides a stepped down voltage and the adjustable variac 54 permits the current to be varied between 0 and 40 amperes in a certain embodiment. The low voltage/high current AC signal is then passed through a rectifier 58, which converts the signal from alternating current to direct current. The controlled direct current output of the rectifier is provided to a polarity reversing relay 60 that is under the control of a timer 62. The timer 62 regulates the frequency and longevity of current reversal events from the relay 60. The output of the relay 60 is connected to the electric cell, such as a HiFEIS Cell, 64 as shown in FIGS. 9a and 9b.

Figures 9A, 9B:
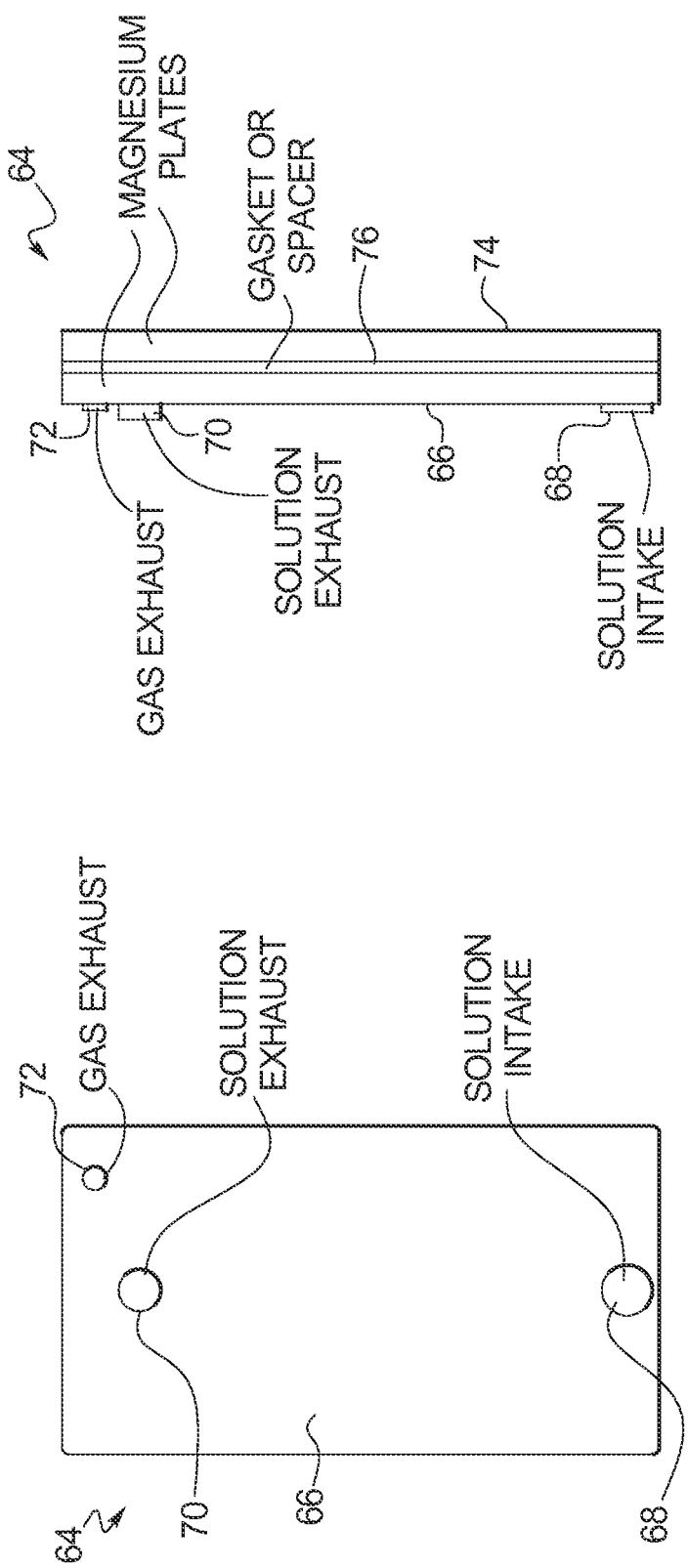
FIGS. 9a & 9b are front and side views of metal plates of a HiFEIS electric cell as used in an exemplary aspect of the present invention.

FIGS. 9a and 9b show an example of the electric cell 64. In FIG. 9a, a front view of the electric cell 64 includes a front plate 66 that has an inlet 68 for the pregnant solution near a bottom of the plate. The inlet 68 includes a fluid conduit connector so that a conduit for carrying the pregnant solution can be provided to the electric cell 64. Adjacent a top of the front plate 66 is a fluid outlet 70 from which liquid that has passed through the cell 64 flows. A fluid conduit connector is provided at the outlet 70 to which a fluid conduit can be connected to carry fluid from the cell 64. Above the fluid outlet 70 is a gas outlet 72. Any gasses generated by the solution treatment can be exhausted from the gas outlet 72.

In the side view of FIG. 9b, the front plate 66 is mounted parallel to a back plate 74 to define a space between the plates 66 and 74. A seal 76 such as a gasket is provided to form a fluid tight seal between the plates 66 and 74. In certain examples, the plates 66 and 74 are spaced apart by a distance of between 3/16 inch and 1/4 inch. The plates 66 and 74 can be provided with spacers to maintain the spacing between them. The plates 66 and 74 of an exemplary embodiment are of 1/4 inch thick magnesium alloy.

The electric cell can be formed by a single pair of plates or by multiple pairs of plates, each receiving a portion of the pregnant solution. The plates can be provided in an arrangement of paired plates. By passing the solution between the plates 66 and 74 while providing the electrical signal from the power supply 50, the solution is treated between the plates of the HiFEIS Cell 64 via an electro-chemical process.

Depending on the traits of the target solution, the strength and/or frequency of switching the power that charges the HiFEIS Cell 64 can be manipulated to optimize results. The amount of current applied can vary from a few amps to hundreds of amps of direct current depending upon the size and number of the HiFEIS Cells 64 in use and the rate of flow of the Slurry. Different plate materials can also be used in the HiFEIS Cell 64 to prevent reaction with certain elements in the target solution or to optimize performance. Plate materials that can be used in the method of the present invention are preferably fabricated from magnesium alloy or stainless steel. Although plates are used to explain the technology the HiFEIS Cell structure can vary in size and shape, from flat plates to cylindrical plates and can be connected individually or one inside the other.

Initially a target compound, such as bauxite, or fly ash, is excavated from a source and slurried with water then transferred to the processing area to be passed through a counter-current decantation circuit.

Figure 1:
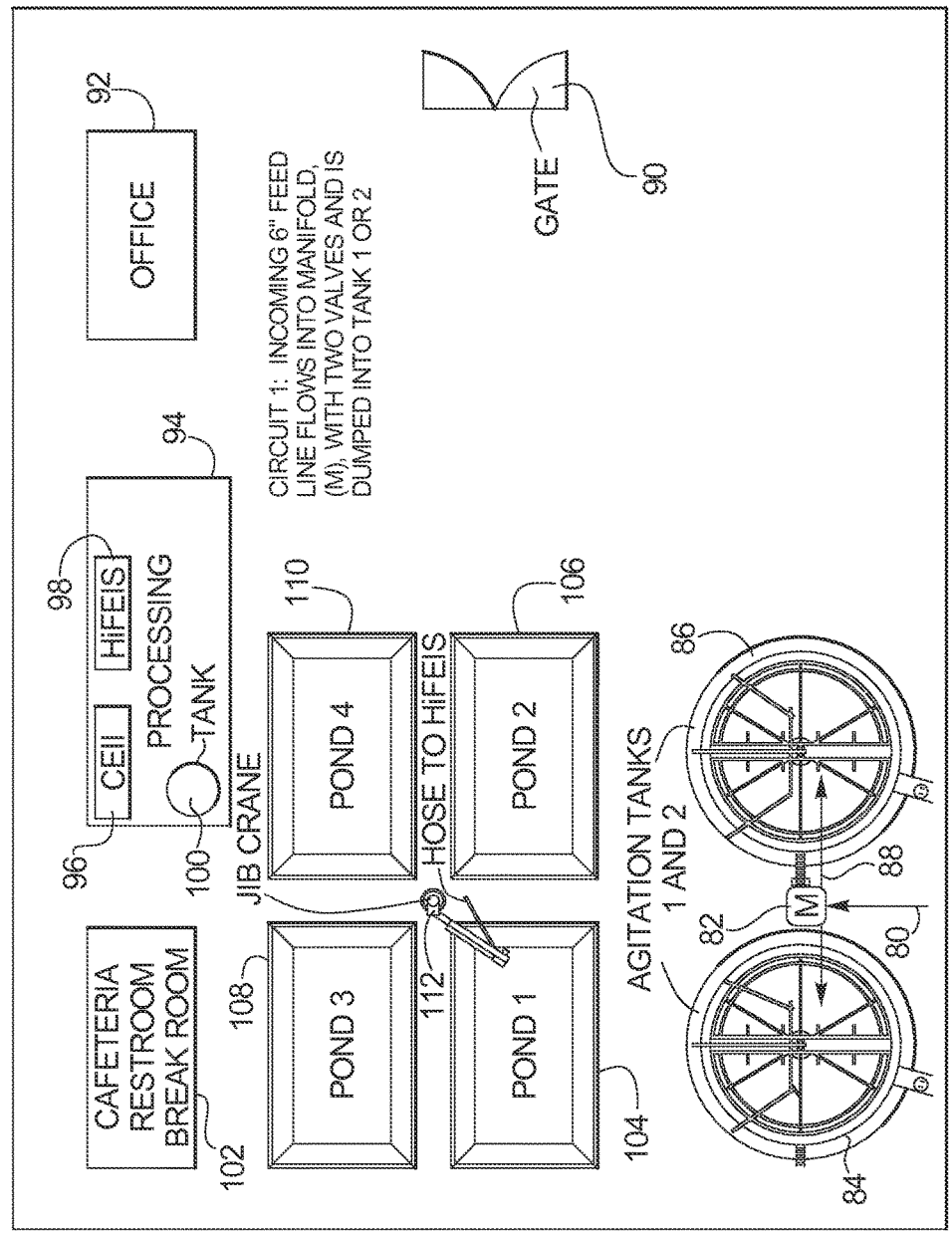
FIG. 1 is a diagram of an aluminum recovery plant showing the equipment and facilities of the plant and illustrating a step, referred to as Circuit 1, of transferring fly ash into an agitation tank according with an aspect of the present invention.

As shown in FIG. 1, in Circuit 1 the incoming slurry feed 80 provides the Slurry into a manifold 82 with two valves that control whether the slurry is dumped into Agitation Tank 1, reference number 84, or agitation tank 2, reference number 86, via an approximately 6" pipe 88. In the tank 84 or 86 the Slurry is mixed in a ratio of 1 part fly ash to 4 parts water, to which is added 2 fluid ounces of sodium hydroxide to each 1 pound (16 ounces) of potential elemental aluminum yield. The potential aluminum yield is calculated by measuring the percentage of aluminum in the fly ash after testing of a sample of the fly ash.

The plant of FIG. 1 also includes a gate 90 for admitting personnel and supplies, an office 92 for administrative personnel, a processing facility 94 in which is located an electric cell 96, a power supply 98 for the cell 96, and a tank 100. The plant includes a cafeteria, restroom, and break room 102. Four ponds 104, 106, 108 and 110 are provided. Fluids are provided to the ponds and removed from the ponds by a fluid transfer apparatus 112.

Figure 2:
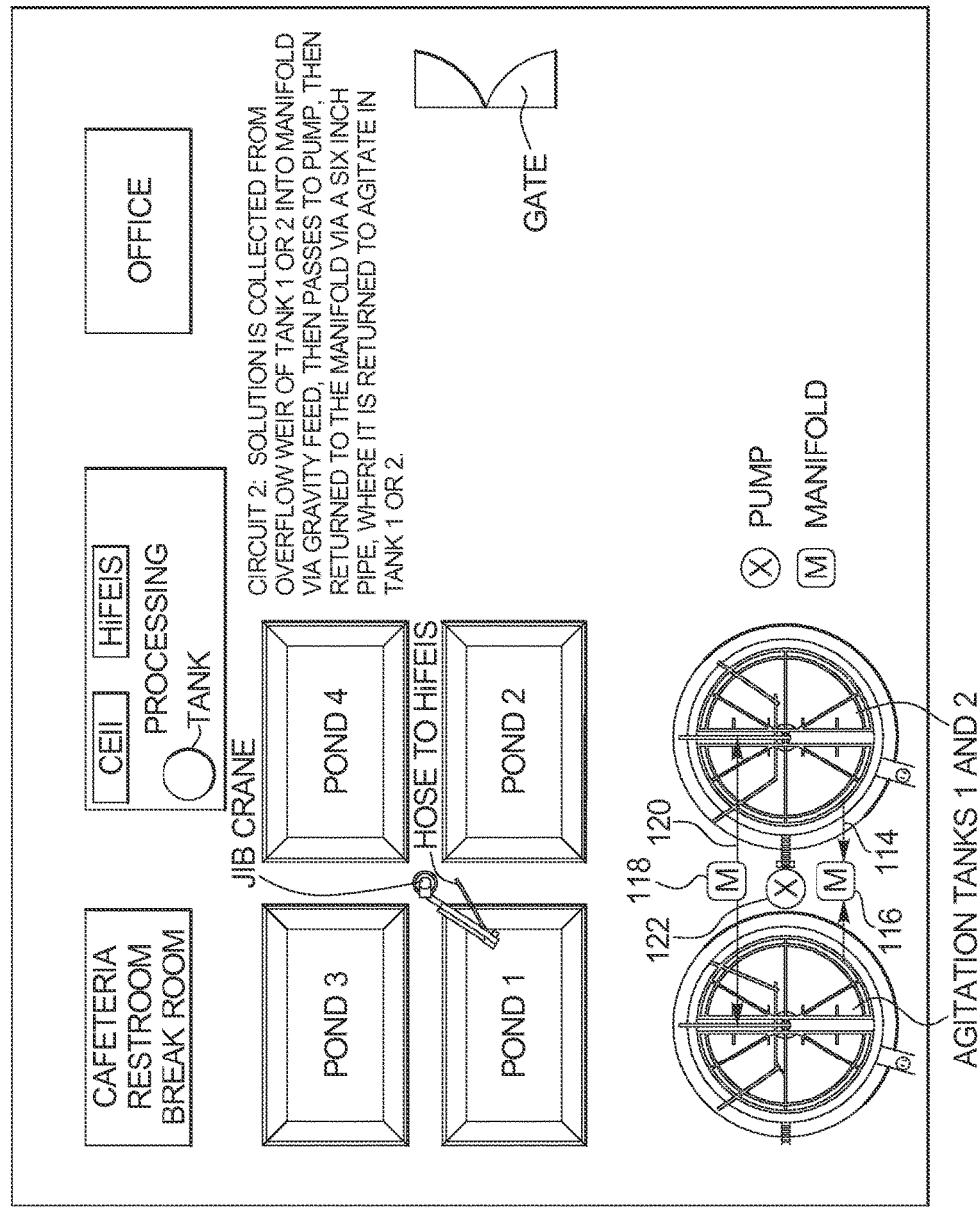
FIG. 2 is a diagram of the aluminum recovery plant of FIG. 1 showing a further step, referred to as Circuit 2, in accordance with the aspect of the present invention.

As shown in FIG. 2, in Circuit 2 an agitated solution is collected from an overflow weir 114 of Agitation Tank 1 or 2, 84 or 86, into a manifold 116 via gravity feed and the solution then passes to a pump 122 and on to a manifold 118 where the solution is returned to agitate in Agitation Tank 1 or 2, 84 and 86, via an approximately 6" pipe 120. As part of the agitation process step of the method of the present invention, the solution is taken from a top of an agitation tank 84 or 86 and returned to a bottom of an agitation tank. This is performed, because the solution in an upper part of an agitation tank has a lower concentration of particles than in a lower part of an agitation tank.

Figure 3:
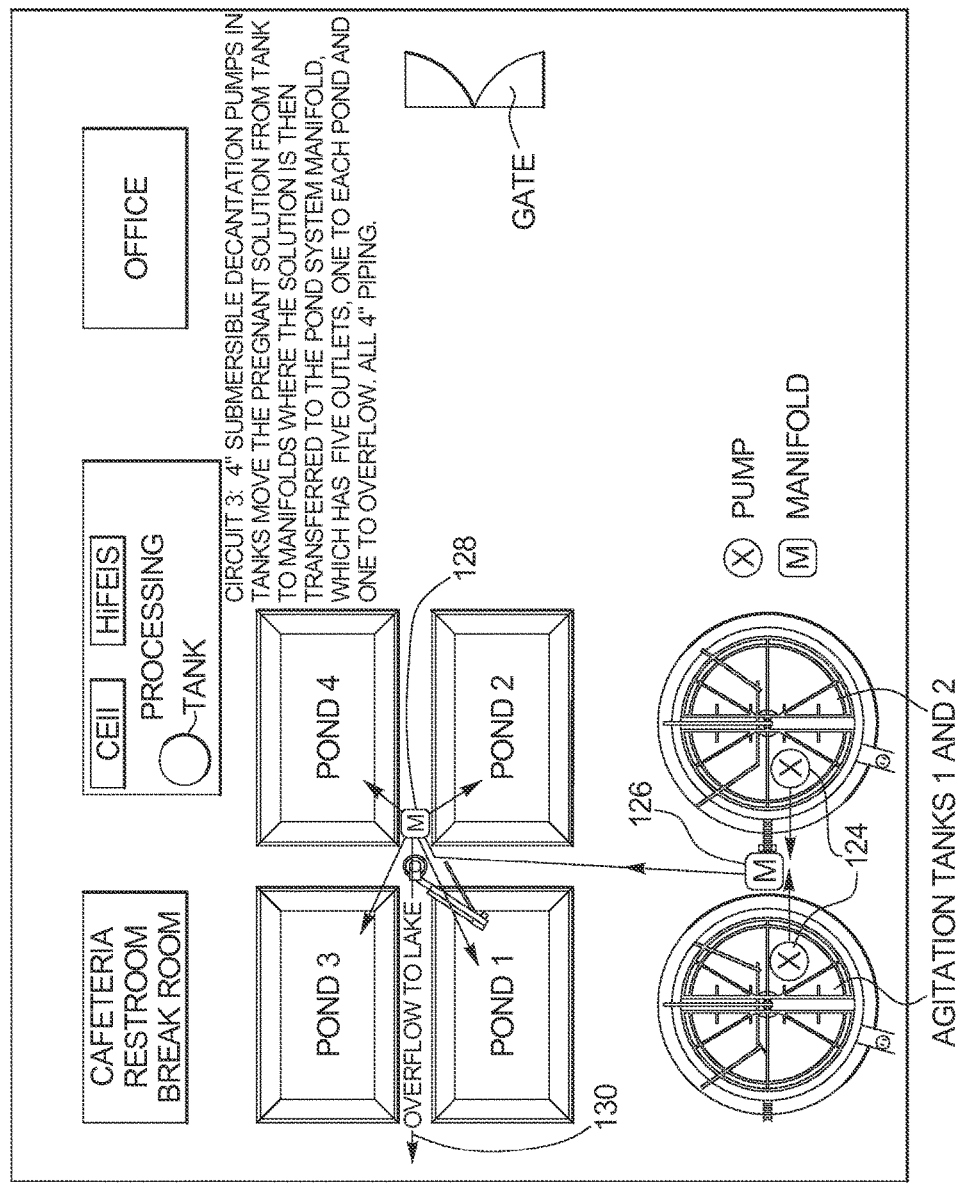
FIG. 3 is a diagram of the aluminum recovery plant of FIG. 1 showing another step, referred to as Circuit 3, in accordance with the aspect of the present invention.

As shown in FIG. 3, in Circuit 3 decant pumps 124 in the Agitation Tanks 84 and 86 move a Pregnant Solution from the Agitation Tanks 84 and 86 to a manifold 126 and the Pregnant Solution then moves to a Pond system manifold 128, which manifold has five outlets with one outlet to each pond 104-110 and one overflow 130 via an approximately 4" pipe and an approximately 4" submersible pump.

Figure 4:
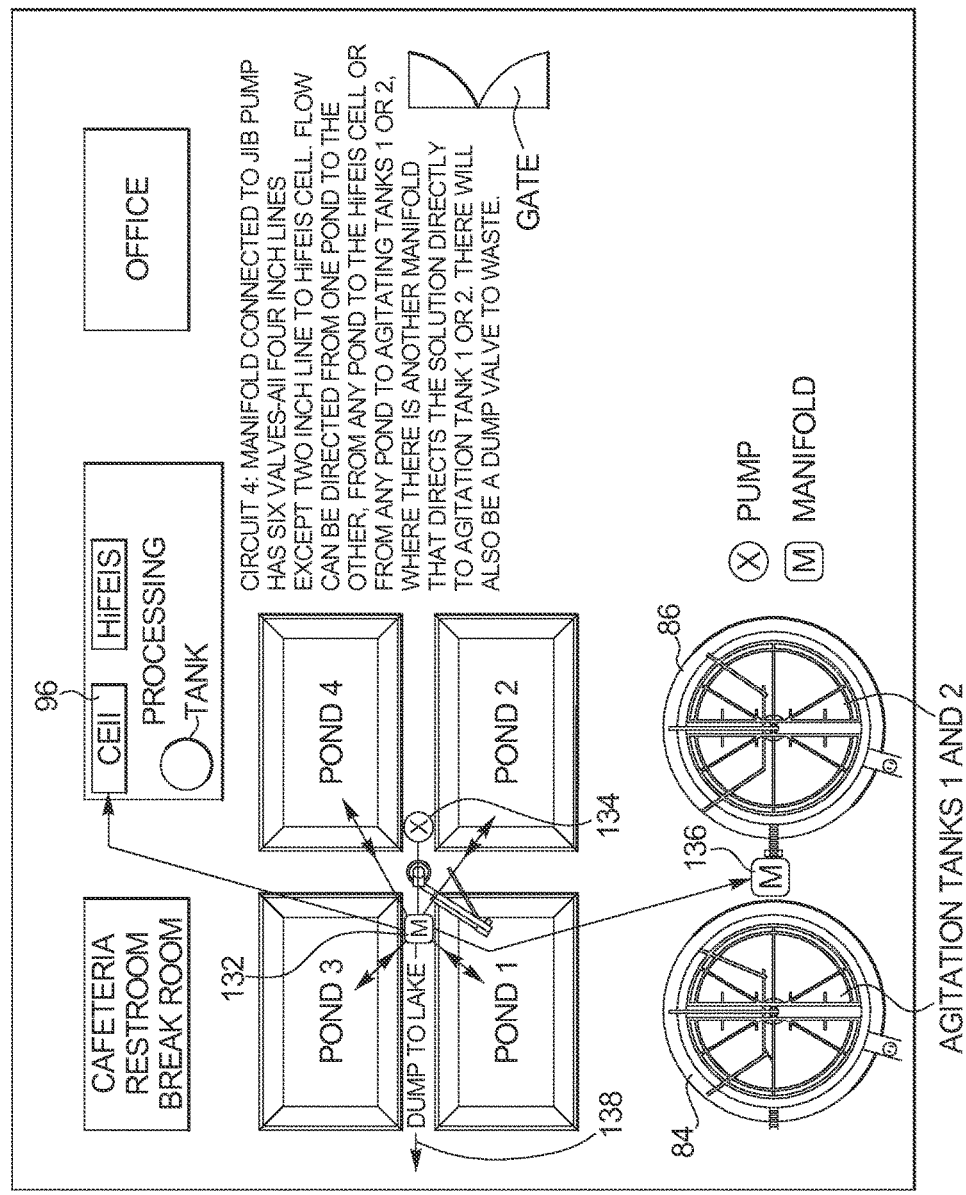
FIG. 4 is a diagram of the aluminum recovery plant of FIG. 1 showing a still a further step, referred to as Circuit 4, in accordance with the aspect of the present invention.

As shown in FIG. 4, in Circuit 4 a manifold 132 is connected to a jib pump 134 with six valves, all approximately 4" pipes, except for an approximately 2" pipe to the HiFEIS Cell 96. The flow can be directed from one pond 104-110 to another, from a pond 104-110 to the HiFEIS Cell 96 or from a pond 104-110 to the Agitation Tanks 84 or 86 where there is another manifold 136 that directs the solution directly into the Agitation Tanks 84 and 86. There is also a dump valve to waste 138. Circuit 4 allows for movement of solution from any agitation tank or pond to any other agitation tank or pond, therefore, allowing for storage of solutions for agitation or settling at any stage in the method of the present invention.

Figure 5:
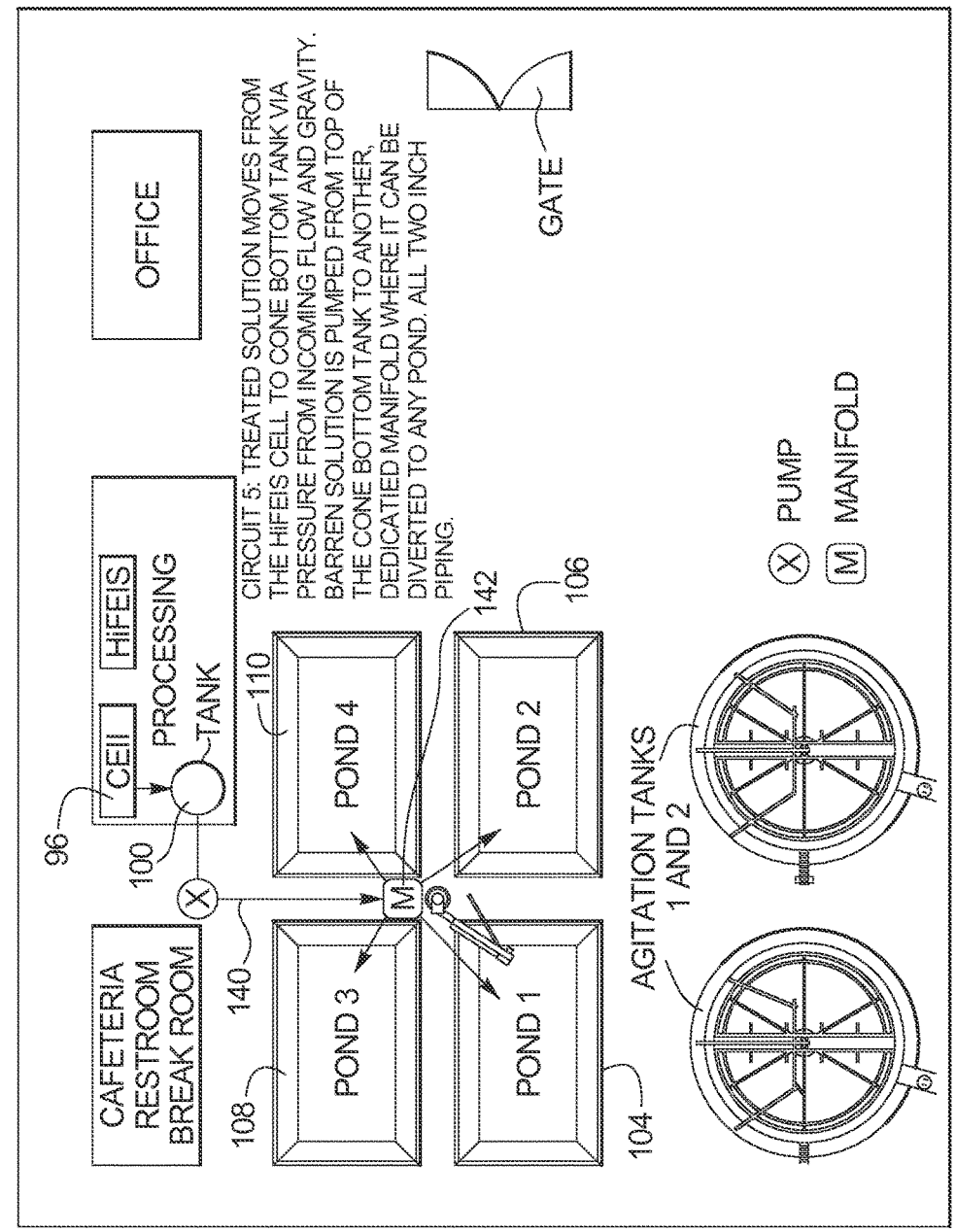
FIG. 5 is a diagram of the aluminum recovery plant of FIG. 1 showing a still another step, referred to as Circuit 5, in accordance with the aspect of the present invention.

As shown in FIG. 5, in Circuit 5 a treated solution moves from the HiFEIS Cell 96 to a cone bottom tank 100 via pressure from the incoming flow and gravity. A barren solution is pumped from the top of the cone bottom tank 100 via an approximately 2" pipe 140 to another dedicated manifold 142 where the barren solution can be diverted to any Pond for reuse.

Figure 6:
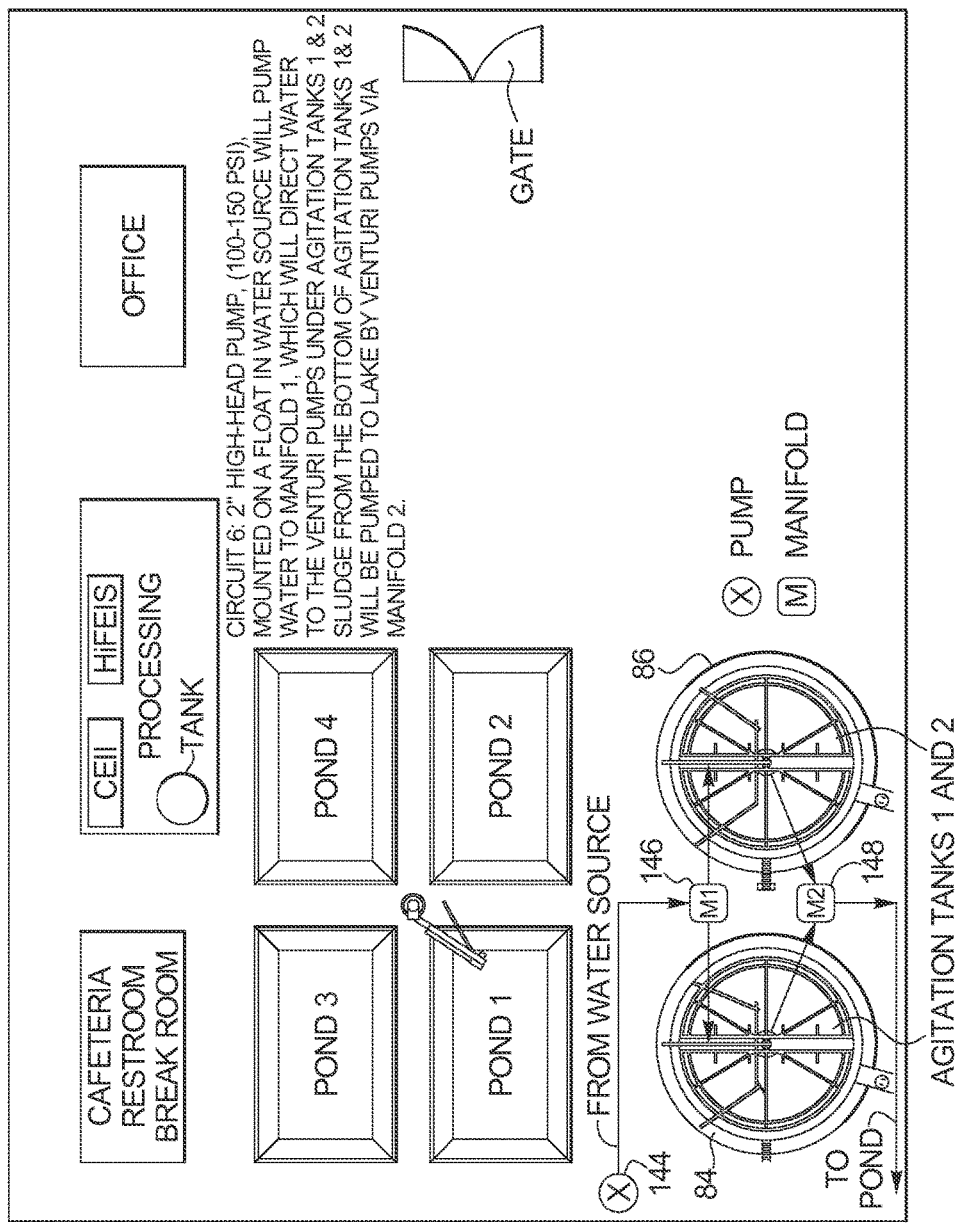
FIG. 6 is a diagram of the aluminum recovery plant of FIG. 1 showing a yet a further step, referred to as Circuit 6, in accordance with the aspect of the present invention.

As shown in FIG. 6, in Circuit 6 an approximately 2" high-head pump 144, (100-150 psi), mounted on a float in water storage, will pump water to manifold 1, 146, which will direct water to the pumps under Agitation Tanks 1 and 2, 84 and 86. To remove sludge from the bottom of the Agitation Tanks, the sludge can be pumped to a waste hole by the pumps via manifold 2, 148.

Figure 7:
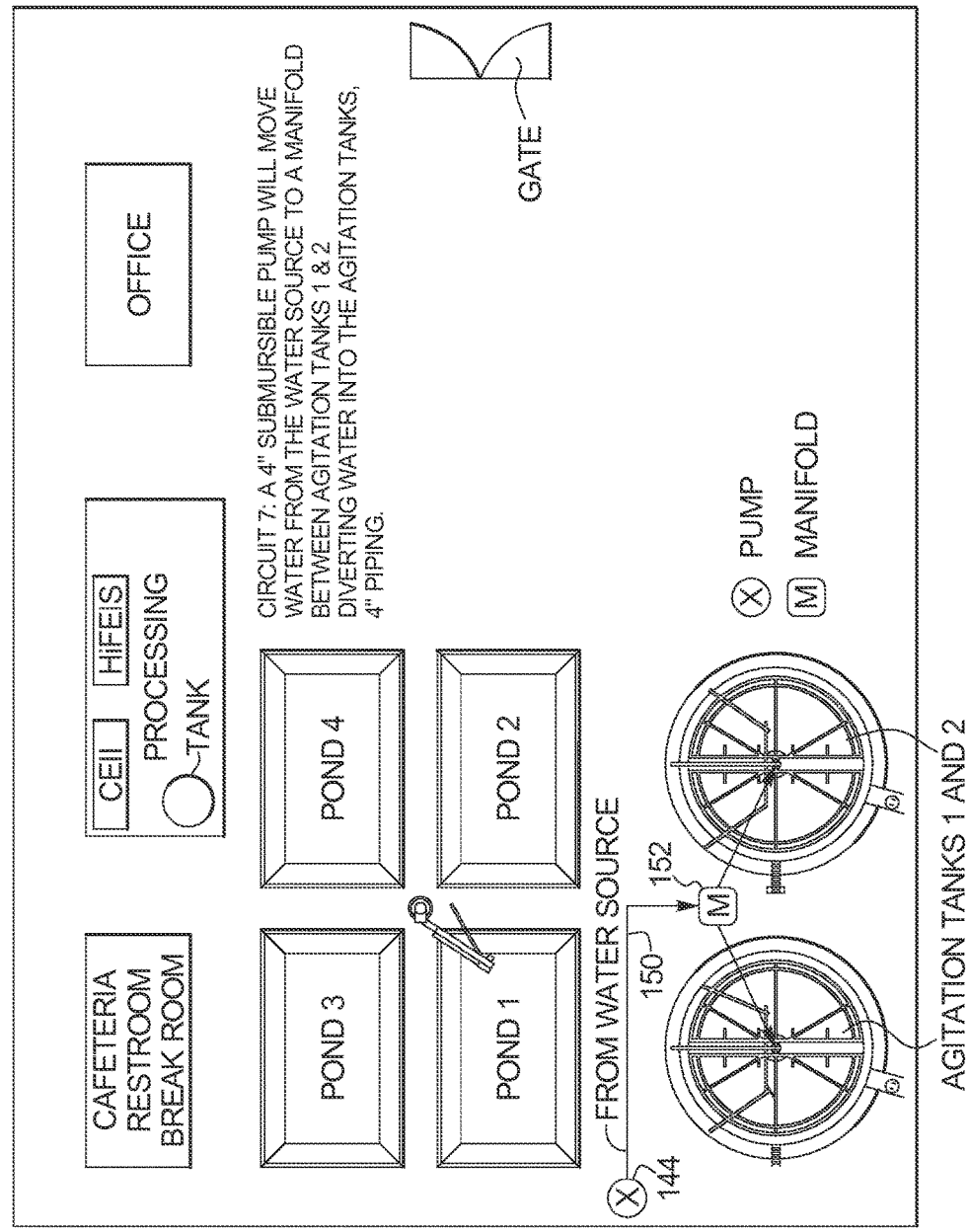
FIG. 7 is a diagram of the aluminum recovery plant of FIG. 1 showing a yet another step, referred to as Circuit 7, in accordance with the aspect of the present invention.

As shown in FIG. 7, in Circuit 7, from the fresh water source there will be an approximately 4" submersible pump 144 which moves water via an approximately 4" pipe 150 to the manifold 152 between Agitation Tanks 1 and 2, 84 and 86, which will be diverted into the Agitation Tanks. Circuit 7 delivers fresh water to the Agitation Tanks 84 and 86 to mix a new batch of solution for processing by the method of the present invention.

Figure 10:
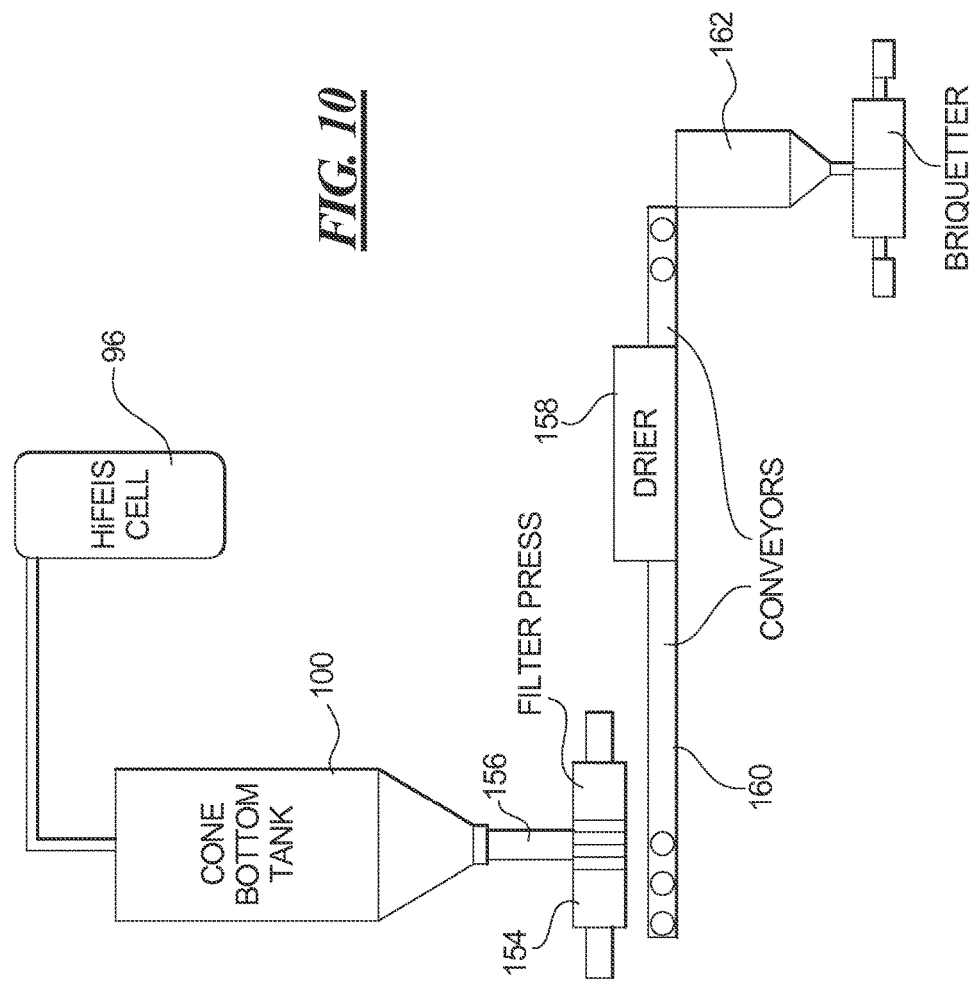
FIG. 10 is a schematic diagram of an apparatus for collecting of elemental aluminum step in accordance with the aspect of the present invention.

As shown in FIG. 10, in a collection step of the method of the present invention, the elemental aluminum is then collected from a bottom of a cone bottomed tank 100 and transferred to a filter press 154 via about 2" piping 156, where as much moisture as possible is eliminated and the aluminum is concentrated. The moist aluminum powder then is conveyed to a drier system 158 by a conveyor 160 that brings the moisture content to equal to or less than 5%. The dried powder then is conveyed to a hydraulic briquetting machine 162, which presses the aluminum powder into a solid cylinder and render it inert for shipping.

The resulting aluminum can include impurities which can be removed by smelting.

Figure 12:
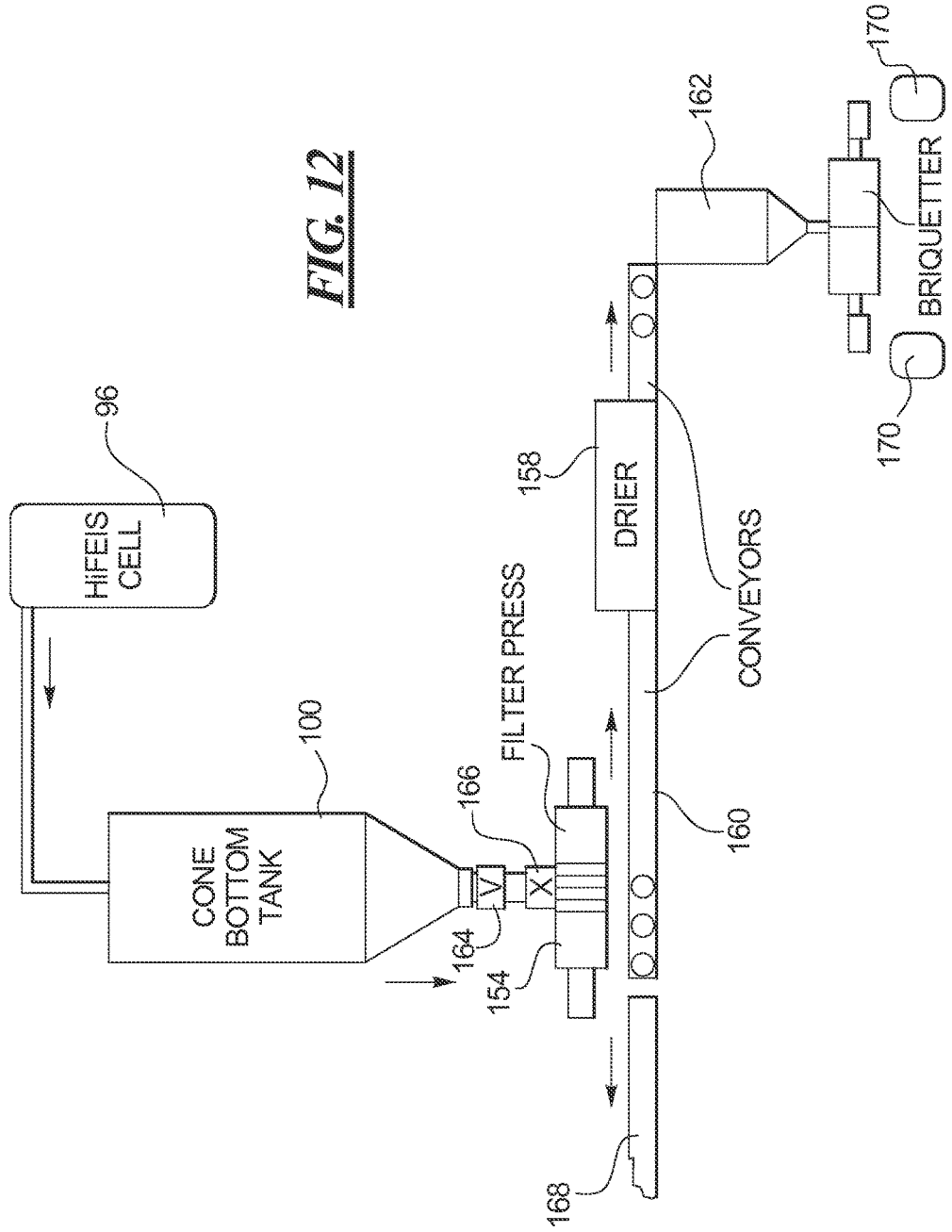
FIG. 12 is a schematic diagram of an alternate aspect of FIG. 10.

FIG. 12 shows another embodiment of the cone bottom tank 100 that includes a valve 164 at the bottom of the tank 100 to permit the process to be interrupted. A pump 166 is provided to flush the particulate aluminum from the tank 100. Also shown is a trough 168 that carries the barren solution away, such as for holding in a pond and reuse in an agitation tank. The compressed powdered aluminum is shown being transferred to bags 170 which are purged of air using nitrogen and sealed to avoid oxidation of the aluminum.

Sodium Hydroxide is lost at a rate of approximately 1.5 oz. to approximately 2 oz. per pound of aluminum produced and will be regenerated in the barren solution that is recycled in, preferably, Pond #4, 110. As shown in FIG. 5, the process will reclaim much of the sodium hydroxide from the barren solution for reuse.

Figure 13:
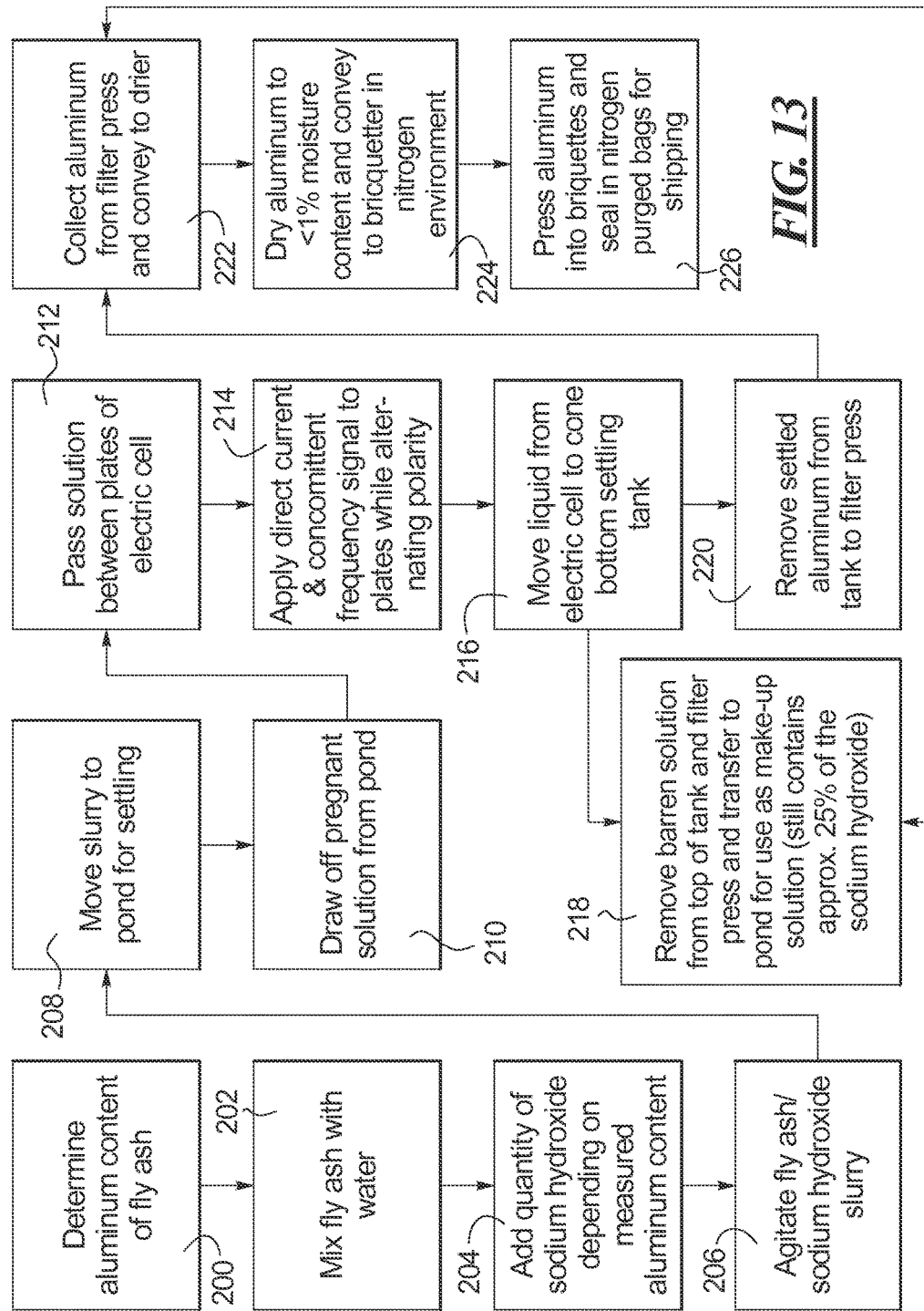
FIG. 13 is a process flow diagram of an alternate aspect of the present method.

In an alternate embodiment as shown in FIG. 13, a first step 200 of determining the aluminum content of the fly as is performed. In step 202, the fly as is mixed with water. In step 204, a quantity of sodium hydroxide is added to the water and fly ash mixture depending on the measured aluminum content of the fly ash. Step 206 provides that the fly ash and sodium hydroxide slurry is agitated. Following the agitating step 206, the process provides step 208 of moving the slurry to a pond for settling. After a duration of time for settling, a pregnant solution is drawn off from the pond in step 210. The pregnant solution is passed between plates of an electric cell in step 212. As the solution is passing between the plates of the electric cell, a direct current is applied to the plates in step 214. The direct current electrical signal is alternated in polarity by a concomitant frequency as it is applied to the plates.

After the electrical signal is applied to the plates while the solution passes between the plates, particles of aluminum have formed in the solution. The liquid that now contains the aluminum particles is moved from the electric cell to a cone bottom settling tank in step 216. As the aluminum particles settle to the bottom of the cone bottom tank, a barren solution (barren of aluminum) remains at the top of the tank. The barren solution is removed from the top of the tank at step 218. In step 220, the aluminum that has settled in the tank is removed and transferred to a filter press. The filter press operates to separate the aluminum particles from the liquid. Aluminum is collected from the filter press in step 222 and conveyed to a drier.

The barren solution that is separated from the aluminum in the filter press is combined with the solution removed from the top of the tank and, according to step 218, the barren solution is transferred to a pond for use as a make-up solution for mixing with the fly ash. In some embodiments, the barren solution still contains approximately 25% of the sodium hydroxide that was provided in the mixture.

According to step 224, the aluminum is dried to less than one percent moisture content and is conveyed to a briquette forming device. The formation of the briquettes is carried out in a nitrogen atmosphere. In step 226, the briquette forming device forms the aluminum into briquettes or other shapes and seals the formed briquettes into bags. The bagged briquettes can be shipped to a destination for melting and forming into aluminum products. In some embodiments, the bags can include air. In other aspects, the bags can be purged of air, for example, by filling the bags with nitrogen or the like.

The fly ash processing plant can use a counter current system circuit. In the following example, four processing ponds are provided in the plant. In certain examples, the fly ash tailings are initially excavated from the source then and transferred to four leaching ponds via a Venturi pump. The four main ponds are charged with slurry of fly ash, water, and sodium hydroxide. The resident time of the solution in each pond in one example is approximately forty-eight hours. Once the solution is ready for processing, the liquid in pond number 3, for example, is removed and is processed through the HiFEIS electric cell. Once the process is underway, using four ponds will allow for solution transfer every twelve hours. Following processing of the liquid from pond number 3, the liquid in pond number 2 is transferred to pond number 3, after which the liquid in pond number 1 will be transferred to pond number 2.

Fresh, barren solution made up of solution from pond number 3, after being processed through the HiFEIS Cell, is transferred to pond number 4 and then will be transferred to pond number 1. The solids in pond number 1 are removed and bagged or stockpiled. The solids are inert and composed primarily of calcium which can be used for fertilizer or building materials such as bricks or block. Solids from pond number 2 are transferred into pond number 1. Solids in pond number 3 are transferred into pond number 2. At this point new fly ash is added to pond number 3. Solutions from pond number 3 are processed through the HiFEIS Cell where the aluminum product precipitates out and is then processed through the filter press where it is collected. The aluminum powder from the filter press is then placed into drums for shipment. Liquid from the filter press is transferred to pond number 4 where it is held until needed. The liquid from pond number 4 is transferred back to pond number 1 and is reused as needed. In certain examples, the leaching reactants are lost at a rate of 1.5 to 2 oz. per pound of aluminum produced and will be regenerated in the barren solution, (in pond number 4), via the HiFEIS Cell.

In certain examples, a fifth pond, pond number 5, serves as an back up pond in case one of the primary ponds is shut down. Pond number 5 can also be used to increase production as the need arises. More or fewer ponds or containments can be provided as need.

Figure 14:
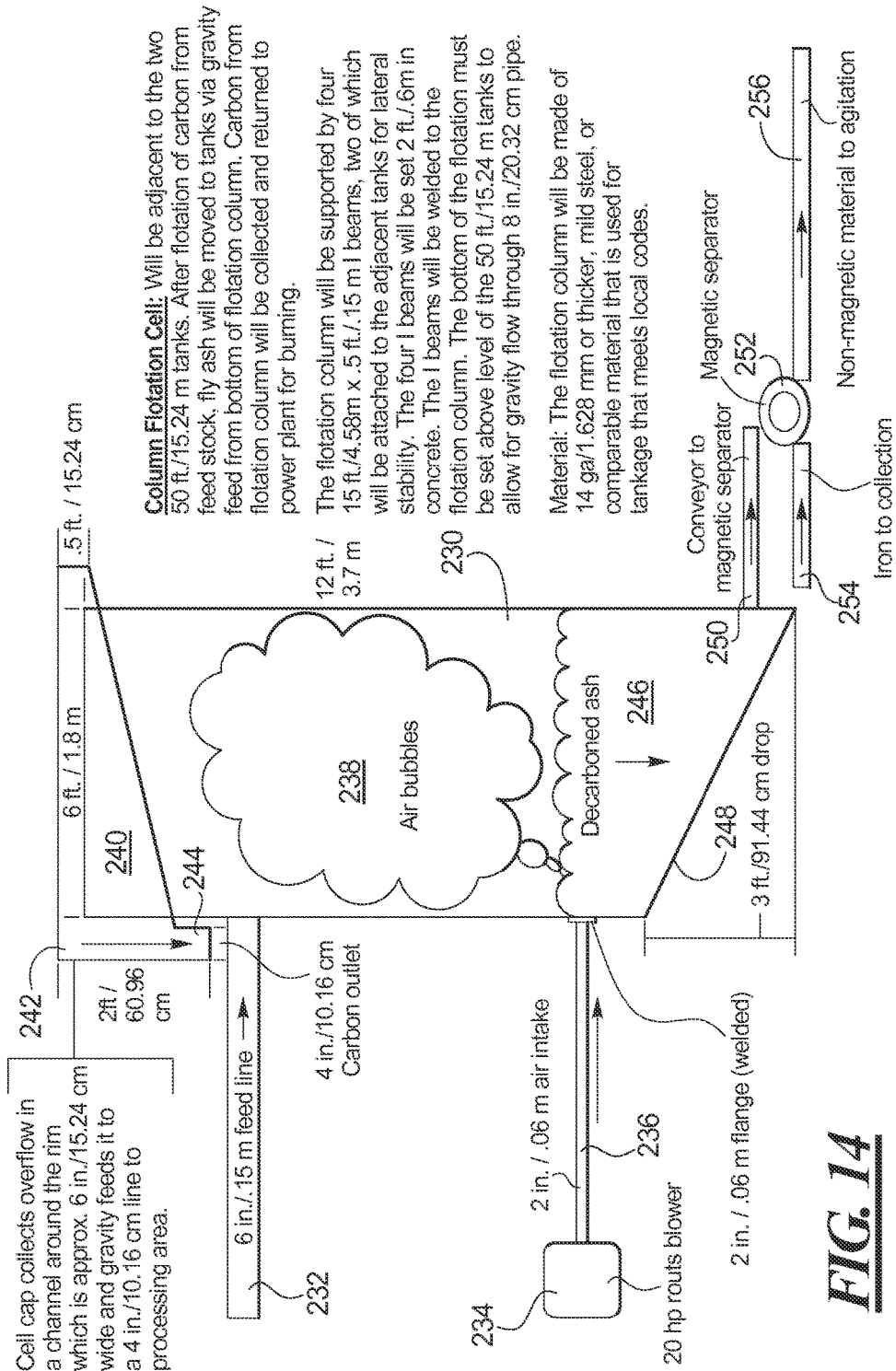
FIG. 14 is a schematic diagram of a float cell magnetic separator in accordance to an aspect of the present invention.

Turning to FIG. 14, a column float cell 230 includes an inlet conduit 232 for feeding fly ash into the cell 230. The inlet conduit 232 of certain examples is a 6 inch conduit. A blower 234 is connected to an air intake 236 that connects into the cell 230. Air is blown into the column float cell 230 by the blower 234 to form air bubbles 238. The air causes carbon 240 to rise in the cell 230 where it reaches a cell cap 242 that extends around the top rim of the cell 230. An angled floor on the cell cap 242 uses gravity to direct the collected carbon to a line at 244 to a processing area. The carbon can be provided to the power plant for burning.

Decarbonized fly ash 246 collects in the lower portion of the cell 230. A slanted floor 248 directs the decarbonized ash to a conveyor 250 that transfers the decarbonized ash to a magnetic separator 252. The output of the magnetic separator 252 includes a conveyor 254 that transfers iron removed from the ash to a collector and a conveyor 256 that transfers the remaining non-magnetic material to an agitator.

In certain embodiments, the floatation cell is made of 14 ga. or thicker mild steel or comparable material. The floatation cell is supported on four 15 feet by 0.5 feet beams, which can be attached to adjacent agitation tanks such as by being set in two feet of concrete. The bottom of the cell 230 is above the agitation tanks to permit gravity to transfer the material to the agitation tanks, such as through an 8 inch pipe or via the conveyor 256.

An optional ancillary system can be used with the method of the present invention. A column flotation cell, as off-the-shelf technology, can be used in conjunction with the method of the present invention and this system can be used to treat the incoming slurry as a means to collect unburned carbon in a fly ash system, which can be recycled to a power plant. This is an alternative step in an alternative embodiment of the method of the present invention by which unburned carbon can be removed before the slurry goes into the Agitation Tanks.

Another optional ancillary system that can be used with the method of the present invention is a magnetic iron separator. As off-the-shelf technology, this system can be used to extract iron from an incoming slurry as a separate profit center. This is an alternative step in an alternative embodiment of the method of the present invention by which iron can be removed before the slurry goes into the Agitation Tanks.

The following provides additional information for constructing and operating a fly ash treatment plant.

Fly Ash Plant

Pre-Production Start Up

Ash Slurry Production Procedure:
A. Tank 1 & 2 Filling Requirement Data
  Holding capacity of circular tank—400 cubic meter each
  Ratio of water to the ash in the slurry by volume ~4:1
  Volume of water in the tank=400×4/5=300 cubic meter (=320 tons of water)
  Volume of ash in the slurry=400×1/5=80 cubic meter
  Bulk density of ash ~2.3 ton/cubic meter
  Weight of ash in the tank=2.3×80=184 tons ~200 tons
  The tank to be filled with 320 cubic meter of water and 200 tons of ash in one filling.
B. Filling Procedure—at SLURRY SUMP
  We make use of slurry sump to mix ash and water.
  Connect water well to the slurry sump by using pump MP-15 and valve system as shown in the attached drawing. Ensure that water is delivered near the bottom of the slurry sump to create mixing of ash and water.
  Capacity of the slurry sump is 40 cubic meter.
  The following procedure is based on the use of front end loader with capacity=5 tons

| SI # | Action | Working Time | Remarks |
|------|--------|--------------|---------|
| 1 | Make three trips with front end loader to charge 15 tons of ash in the slurry sump | 15 minutes @ 5 minutes per trip of the loader. | |
| 2 | Start pump MP-15 and supply water to the slurry sump. Ensure that water is discharged near the bottom of the sump to ensure mixing of ash and water. | Pump operating time - 10 minutes | Pump capacity is 150 cubic meter/hr. It will supply 25 cubic meter of water in 10 minutes. |
| 3 | Start sump pump MP-14 and valve system V07-12, 11, and 15 and the fill the floatation cell to the top and stop pump MP-14. | Operating time - 15 minutes to empty the sump. | Start the root blower to agitate water in the floatation cell. |
| 3 | Hold the ash slurry in the floatation cell to remove carbon from the ash slurry. Remove the carbon from top of the floatation cell by using hand scrapper. | Holding time - 30 to 45 minutes. | Holding time to be adjusted by observation at the floatation cell top to see that carbon is removed from the slurry in the floatation cell |
| 4 | After the carbon is removed start the magnetic separator and open the valve V07-016 (below the floatation cell) and valve V07-17 (delivery valve for tank #1) | Time 15 minutes | Empty the flotation cell and wait for next filling. Keep the root blower running. |
| 4 | Repeat operation @ Sl #1 to 4 for 13 times | | |
| 5 | Total time of one sequence from Sl #1 to 4 | 100 minutes | |
| 6 | Ash supplied in one sequence of operations | 15 tons | |
| 7 | Ash Supplied in 13 sequence of operations | 195 tons~200 tons | |
| 8 | Total time to make one filling of circular tank with 13 operations @ 100 minutes per operation | 100 × 13 = 1300 minutes ~ 22 hrs | |

Level of ash slurry with 15 tons of ash and 25 cubic meter of water ~2 m from sump base. This will ensure proper ratio of water and ash.

Keep a constant watch and observe carbon removal process in the floatation cell and adjust holding time accordingly.

Keep a constant watch and observe removal of iron oxide from the ash slurry. Adjust water flow rate from the floatation cell if necessary.

Collection of Hydrogen Gas

The methods and apparatus described above may be used for generating and collecting one or more products instead of or in addition to aluminum, including for generating and collecting hydrogen gas, as will be described in the following. The foregoing disclosure is incorporated herein by reference.

The HiFEIS System excels in the field of remediation of toxic waste and desalination of sea water over any other technologies. All compounds and elements can be separated, concentrated and collected for use and in the case of desalination the end products are potable water, electricity, hydrogen gas, sodium hydroxide and calcium & magnesium chloride, with no residual sodium chloride.

The HiFEIS System can produce potable water from sea water or any other water, no matter what it contains. It can also produce elemental metals from a base solution, whether in a natural or contaminated state. It can also produce hydrogen gas and electricity as byproducts of certain processes. Since molecular reorganization occurs it is reasonable that through the process unwanted base compounds may be manipulated and transformed into useful or desirable end products, i.e.; in the case of desalination, potable water, electricity, hydrogen, calcium & magnesium chloride and sodium hydroxide will be the end products with no pile of salt left to deal with.

The HiFEIS System consists of a proprietary combination of circuitry, #2 & #3, that produces controlled, oscillating harmonic waves at a very high rate that are introduced to the selected medium. The solution is passed through a HiFEIS Cell, #1, that consists of metal plates of opposing polarity, where it is exposed to the desired frequency. The plates may consist of different materials depending on objectives. When the particular wave length is introduced to the medium, molecular reorganization occurs and the elements are separated and collected leaving potable water and in the case of desalination electricity and hydrogen gas are harvested.

The invention works by means of the desired solution, i.e.; alumina, fly ash, sea water and etc.; in a liquid or slurry form are passed through a HiFEIS Cell, #1, which consists of a series of metal plates of opposing polarity where it is subjected to controlled, oscillating harmonic waves, introduced by the HiFEIS Controller and Driver, #2 & #3, that produce a very rapidly collapsing magnetic field. When the particular wave length is introduced to the solution, molecular reorganization occurs and the elements in the solution are separated and collected. In the case of desalination, hydrogen gas and electrons are freed and the hydrogen is collected by a vacuum and the free electrons are collected as electricity by the plates of the HiFEIS Cell, #1. By altering the composition of the plates used in the HiFEIS Cell and the harmonic frequency introduced to the system the following applications have been employed: desalination of sea water netting potable water, electricity, hydrogen, sodium hydroxide and calcium and magnesium chloride; remediation of fly ash, netting elemental aluminum, iron and calcium substrates; isolation of radioactive isotopes from polluted water; sewage treatment; hydrocarbon isolation from oily water, and removal of almost any compounds or elements from a liquid solution. In all cases potable water can be a byproduct.

The HiFEIS System consists of three main parts: #1—HiFEIS Cell, which, depending on the volume and composition of the target solution, consists of a series of metal plates that the solution passes between. The plates are insulated from each other by a gasket that has a built in veil at either end which will allow the collection of elements. The plates are connected to the HiFEIS Controller, #2, and the HiFEIS Driver, #3, electrically, from which the desired frequency is supplied. Either pumps or gravity flow will move the solution through the HiFEIS Cell. If hydrogen is to be collected there will be a vacuum system to pull off the gas and collect it. In the desalination process the plates will be wired to collect electricity.

The elements that are necessary in the HiFEIS System are the HiFEIS Cell, #1, HiFEIS Controller, #2 and the HiFEIS Driver, #3. Depending on the application desired there may be several options including: gravity feed, pumps, additional plumbing, additional wiring and variation of materials. To make the system produce more volume there is the option of adding more HiFEIS Cells. The system is scalable.

The construction of the HiFEIS Cell could be reconfigured in the form of cylinders instead of flat plates. The use of different materials besides metals for the plates of the HiFEIS Cell could be interchanged. The proprietary components of the HiFEIS Controller, #2 and Driver, #3 could be reproduced if stolen but the frequency will be protected.

Depending on the type of medium to be processed one would set up the HiFEIS System desired and plumb in the ancillary system that transports the medium to the HiFEIS Cell, #1, for processing. The residual elements are then collected in the appropriate containers for transport or use on site.

Additionally, the HiFEIS system could possibly be used to produce a renewable fuel source by recycling elements through the system. Purified water from the system is so clean it could be used to leach existing pollutants from ground water or capture air pollutants that are then run back through the system and precipitated out. There are a wide variety of different uses, including agricultural, transportation, space travel, mining, petroleum production and environmental.

Also, the HiFEIS System can produce potable water from sea water or any other water, no matter what it contains. It can also isolate elemental metals from a base solution, whether in a natural or contaminated state. It can also produce hydrogen gas and electricity as byproducts of certain processes. Since molecular reorganization occurs it is reasonable that through the process unwanted base compounds may be manipulated and transformed into useful or desirable end products, i.e.; in the case of desalination, potable water, electricity, hydrogen, calcium & magnesium chloride and sodium hydroxide will be the end products with no pile of salt left to deal with.

A Further Embodiment

The HiFEIS System remediates fly ash, desalinates sea water, cleans sewage and removes any substances from a base solution. The HiFEIS System is efficient in waste remediation and desalination by effectively solving the problem of residual waste. Other advantages over current systems are the low initial cost of a production plant and quick return of investment due to the usefulness of the elements collected and electricity produced.

The HiFEIS System remediates fly ash by separating and concentrating the elements found in fly ash for use in other applications. The desalination application produces potable water and electricity with no residual of sodium chloride. Any compound or element, including radioactive materials, can be removed from a solution, concentrated and collected for future use with a net of potable water. The compounds and elements that can be separated, concentrated and collected for use and in the case of desalination the end products are potable water, electricity, hydrogen gas, sodium hydroxide and calcium and magnesium chloride, with no residual sodium chloride.

Also, the HiFEIS System can produce potable water from sea water or any other water, no matter what it contains. It can also produce elemental metals from a base solution, whether in a natural or contaminated state. It can also produce hydrogen gas and electricity as byproducts of certain processes. Since molecular reorganization occurs it is reasonable that through the process unwanted base compounds may be manipulated and transformed into useful or desirable end products. In the case of desalination, potable water, electricity, hydrogen, calcium and magnesium chloride and sodium hydroxide will be the end products with no pile of salt left to deal with.

The apparatus includes a HiFEIS cell, a HiFEIS controller, and a HiFEIS driver.

The HiFEIS system consists of a combination of circuitry, in the form of the HiFEIS controller and a HiFEIS driver, that produces controlled, oscillating harmonic waves at a very high rate that are introduced to the selected medium. The solution is passed through the HiFEIS cell where it is exposed to the desired frequency. The HiFEIS cell includes of metal plates of opposing polarity. The plates may consist of different materials depending on objectives. When the particular wave length is introduced to the medium, molecular reorganization occurs and the elements are separated and collected, leaving potable water and in the case of desalination electricity and hydrogen gas are harvested.

The desired solution, i.e. fly ash, sea water, etc. in a liquid or slurry form are passed through the HiFEIS cell. A series of metal plates of opposing polarity of the HiFEIS cell is subjected to controlled, oscillating harmonic waves, introduced by the HiFEIS controller and driver, that produce a very rapidly collapsing magnetic field. When the particular wave length is introduced to the solution, molecular reorganization occurs and the elements in the solution are separated and collected.

In the case of desalination, hydrogen gas and electrons are freed and the hydrogen is collected by a vacuum and the free electrons are collected as electricity by the plates of the HiFEIS cell. By altering the composition of the plates used in the HiFEIS cell and the harmonic frequency introduced to the system, the following applications have been employed: desalination of sea water netting potable water, electricity, hydrogen, sodium hydroxide and calcium chloride and magnesium chloride; remediation of fly ash, netting elemental aluminum, iron and calcium substrates; isolation of radioactive isotopes from polluted water; sewage treatment; hydrocarbon isolation from oily water, and removal of almost any compounds or elements from a liquid solution. In all cases potable water can be a byproduct.

The HiFEIS System includes three main parts, the first of which is the HiFEIS cell, which, depending on the volume and composition at the target solution consists of a series of metal plates that the solution passes between. The plates are insulated from each other by a gasket that has a built in veil at either end which will allow the collection of elements. The plates are connected to the HiFEIS controller and the HiFEIS driver electrically, from which the desired frequency is supplied. Either pumps or gravity flow will move the solution through the HiFEIS cell. If hydrogen is to be collected there will be a vacuum system to pull off the gas and collect it. In the desalination process the plates will be wired to collect electricity.

The elements that are necessary in the HiFEIS system are the HiFEIS cell, the HiFEIS controller, and the HiFEIS driver. Depending on the application desired there may be several options, including: gravity feed, pumps, additional plumbing, additional wiring and variation of materials. To make the system produce more volume there is the option of adding more HiFEIS cells. The system is scalable.

The construction of the HiFEIS Cell could be reconfigured in the form of cylinders instead of flat plates, The use of different materials besides metals for the plates of the HiFEIS cell could be interchanged. The proprietary components of the HiFEIS controller and driver could be reproduced if stolen but the frequency will be protected.

How to Use the Invention:

Depending on the type of medium to be processed one would set up the HiFEIS system desired and plumb in the ancillary system that transports the medium to the HiFEIS cell for processing. The residual elements are then collected in the appropriate containers for transport or use on site.

Additionally, the HiFEIS system could possibly be used to produce a renewable fuel source by recycling elements through the system. Purified water from the system is so clean it could be used to leach existing pollutants from ground water or capture air pollutants that are then run back through the system and precipitated out There are a wide variety of different uses, including agricultural, transportation, space travel, mining, petroleum production and environmental.

The HiFEIS System can produce potable water from sea water or any other water, no matter what it contains. It can also isolate elemental metals from a base solution, whether in a natural or contaminated state. It can also produce hydrogen gas and electricity as byproducts of certain processes. Since molecular reorganization occurs it is reasonable that through the process unwanted base compounds may be manipulated and transformed into useful or desirable end products, i.e.; In the case of desalination, potable water, electricity, hydrogen, calcium & magnesium chloride and sodium hydroxide will be the end products with no pile of salt left to deal with. Separation of elements using harmonic waves as a solution is passed between two metal plates is disclosed. The HiFEIS System is efficient in waste remediation and desalination by effectively solving the problem of residual waste. Other advantages over current systems are the low initial cost of a production plant and quick return of investment due to the usefulness of the elements collected and electricity produced.

Although the present invention has been described with reference to specific embodiments, it is understood that modifications and variations of the present invention are possible without departing from the scope of the invention, which is defined by the claims set forth below.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

The invention claimed is:

1. An apparatus for separating aluminum from a source material, comprising:
    an agitating tank that is operable to agitate a slurry comprising the source material, water, and a leaching reactant;
    a holding containment that is connected to receive the agitated slurry from the agitating tank to separate a pregnant solution from settled solids;
    a pump to transfer the pregnant solution from the holding containment;
    an electric cell including at least two parallel conductive plates spaced apart by a distance to form a treatment space to receive the pregnant solution;
    a power supply connected to the at least two parallel conductive plates and operable to apply an electrical signal to the at least two parallel conductive plates to form a treated solution comprising aluminum particulate, the power supply being configured to supply the electric signal as a direct current of periodically reversing polarity to the at least two parallel conductive plates;
    wherein the pump is operable to supply the pregnant solution to the treatment space of the electric cell while the power supply supplies the periodically reversing polarity electric signal to the at least two parallel conductive plates of the electric cell;
    wherein the electric cell and the direct current of periodically reversing polarity provided by the power supply are configured to form particles of aluminum within the pregnant solution, the electric cell and the direct current of periodically reversing polarity are configured so that the aluminum particulate are suspended in the treated solution as the treated solution leaves the electric cell; and
    a separator connected to receive the treated solution from the electric cell and operable to separate the aluminum particulate from the treated solution.

2. An apparatus as claimed in claim 1, wherein the separator includes a cone bottom tank and a filter press.

3. An apparatus as claimed in claim 1, wherein the electric cell includes the at least two parallel conductive plates having an inlet for the pregnant solution at a lower position and an outlet for the treated solution at an upper position, and a gas outlet above the outlet for the treated solution.

4. An apparatus as claimed in claim 1, wherein the at least two parallel conductive plates are of magnesium alloy, stainless steel, carbon, carbon-based material, or a combination thereof.

5. An apparatus as claimed in claim 1, wherein the agitating tank includes a plurality of agitating tanks connected to receive the slurry; wherein the holding containment includes a plurality of ponds connected to receive the agitated slurry; and further comprising:
    a containment for barren solution separated from the aluminum particulate.

6. An apparatus as claimed in claim 1, wherein the electric cell is configured to keep the pregnant solution constantly moving through the electric cell.

7. An apparatus as claimed in claim 6, wherein the pump is configured to constantly move the pregnant solution through the treatment space of the electric cell during the application of the electric signal.

\* \* \* \* \*